United States Patent
Lee et al.

(10) Patent No.: US 11,340,651 B2
(45) Date of Patent: May 24, 2022

(54) ROTATION MODULE AND DISPLAY APPARATUS INCLUDING THE SAME

(71) Applicants: SAMSUNG ELECTRONICS CO., LTD., Suwon-si (KR); U4MTECH, Seoul (KR)

(72) Inventors: Jaeneung Lee, Suwon-si (KR); Chul-Yong Cho, Suwon-si (KR); Moonyoung Kim, Suwon-si (KR); Soonsuk Seo, Seoul (KR)

(73) Assignees: SAMSUNG ELECTRONICS CO., LTD., Suwon-si (KR); U4MTECH, Seoul (KR)

( * ) Notice: Subject to any disclaimer, the term of this patent is extended or adjusted under 35 U.S.C. 154(b) by 23 days.

(21) Appl. No.: 16/915,458

(22) Filed: Jun. 29, 2020

(65) Prior Publication Data

US 2021/0318722 A1    Oct. 14, 2021

(30) Foreign Application Priority Data

Apr. 8, 2020    (KR) .................. 10-2020-0042874

(51) Int. Cl.
*G06F 1/16* (2006.01)
*G02F 1/1333* (2006.01)

(52) U.S. Cl.
CPC ...... *G06F 1/1618* (2013.01); *G02F 1/133308* (2013.01); *G06F 2200/1637* (2013.01)

(58) Field of Classification Search
CPC ............. G06F 1/1601; G06F 1/0607; G06F 2200/1614; H05K 5/0204; H05K 5/0234
See application file for complete search history.

(56) References Cited

U.S. PATENT DOCUMENTS

| | | | |
|---|---|---|---|
| 5,923,528 A * | 7/1999 | Lee ...................... | F16M 11/105 361/679.07 |
| 7,748,670 B1 * | 7/2010 | Veldez .................. | F16M 13/02 248/181.1 |

(Continued)

FOREIGN PATENT DOCUMENTS

| CN | 101034593 A | 9/2007 |
|---|---|---|
| CN | 207230086 U | 4/2018 |

(Continued)

OTHER PUBLICATIONS

European Search Report dated Oct. 26, 2020 by the European Patent Office in counterpart Euroepan Patent Application No. 20180316.0.

(Continued)

*Primary Examiner* — Anthony Q Edwards
(74) *Attorney, Agent, or Firm* — Sughrue Mion, PLLC

(57) ABSTRACT

A display apparatus includes a display including a front surface configured to display an image and a rear surface provided with a mounting groove. The display apparatus further includes a rotation module including at least one body that is configured to couple to the display by being inserted into the mounting groove, the rotation module further including a drive motor configured to provide a driving force to rotate the display about an axis perpendicular to the front surface and the rear surface of the display. The display apparatus further includes a bracket configured to be mounted on a stand or a wall and to which the rotation module is coupled. The display and the rotation module are configured to lock together by the display and the rotation module being coupled.

20 Claims, 19 Drawing Sheets

(56) References Cited

U.S. PATENT DOCUMENTS

| | | | |
|---|---|---|---|
| 9,782,003 B2* | 10/2017 | Trachtenberg | F16M 11/105 |
| 2008/0001048 A1 | 1/2008 | Woo et al. | |
| 2008/0303805 A1* | 12/2008 | Chien | F16M 11/2021 |
| | | | 345/204 |
| 2012/0236475 A1* | 9/2012 | Peng | F16M 13/005 |
| | | | 361/679.01 |
| 2015/0070594 A1* | 3/2015 | Trachtenberg | H04N 5/64 |
| | | | 348/841 |
| 2019/0318710 A1* | 10/2019 | Gurr | F16M 11/105 |
| 2020/0053891 A1* | 2/2020 | Kim | H04M 1/0212 |
| 2020/0084902 A1* | 3/2020 | Venkatesh | F16M 11/16 |
| 2020/0344902 A1* | 10/2020 | Choi | F16M 11/22 |

FOREIGN PATENT DOCUMENTS

| | | |
|---|---|---|
| CN | 208180924 U | 12/2018 |
| CN | 109450111 A | 3/2019 |
| CN | 110148990 A | 8/2019 |
| CN | 110654319 A | 1/2020 |
| EP | 3 315 816 A1 | 5/2018 |
| EP | 3 588 942 A1 | 1/2020 |
| KR | 10-2013-0083520 A | 7/2013 |
| KR | 10-2019-0120553 A | 10/2019 |

OTHER PUBLICATIONS

International Search Report dated Dec. 21, 2020 by the International Searching Authority in counterpart international Patent Application No. PCT/KR2020/008665.

Communication dated Jul. 15, 2020, issued by the Korean Intellectual Property Office in counterpart English Korean Patent Application No. 10-2020-0042874.

Communication dated May 28, 2021 issued by the State Intellectual Property Office of P.R. China in English counterpart Chinese Application No. 202010446026.4.

Communication dated Feb. 9, 2022, issued by the European Patent Office in counterpart European Application No. 20180316.0.

* cited by examiner

ROTATION MODULE AND DISPLAY APPARATUS INCLUDING THE SAME

CROSS-REFERENCE TO THE RELATED APPLICATION

This application is based on and claims priority under 35 U.S.C. § 119 to Korean Patent Application No. 10-2020-0042874 filed on Apr. 8, 2020, in the Korean Intellectual Property Office, the disclosure of which is incorporated by reference herein in its entirety.

BACKGROUND

1. Field

Embodiments of the disclosure relate to a display apparatus including a display module and a rotation module capable of rotatably supporting the display module.

2. Description of Related Art

A display apparatus is a type of output device that visually displays data information such as characters, graphics, and images.

The display apparatus may include a self-luminous display panel such as an organic light emitting diode (OLED) panel, or a non-self-luminous display panel such as a liquid crystal display (LCD) panel.

The display apparatus may include a display module for displaying an image and a supporter for supporting the display module. The supporter may be provided to support the display module so that the front surface of the display module displaying the image may be directed to the viewer.

Recently, a display apparatus including a display module and a supporter configured to rotatably support the display module has been disclosed. However, in such display apparatus, the display module and the supporter may not be separated from each other because the display module and the supporter are integrally formed with each other.

SUMMARY

Therefore, it is an aspect of the disclosure to provide a display apparatus including a display module and a supporter configured to rotatably support the display module and configured to be detachable from the display module.

It is another aspect of the disclosure to provide a display apparatus having improved usability by selectively using a wall-mounted type or a stand-type.

It is another aspect of the disclosure to provide a display apparatus capable of easily changing the type and allowing easy movement, and capable of rotating a display module.

It is another aspect of the disclosure to provide a display apparatus including a display module configured to be driven without being directly connected to an external power supply.

It is another aspect of the disclosure to provide a display apparatus having improved productivity by including a rotation module applicable to a display module in various sizes and in various types.

It is another aspect of the disclosure to provide a display apparatus including a supporter configured to rotatably support a conventional display module by including a rotating bracket coupled to a conventional display module and a rotation module configured to rotate the rotating bracket.

Additional aspects of the disclosure will be set forth in part in the description which follows and, in part, will be understood from the description, or may be learned by practice of the disclosure.

According to one or more embodiments, a display apparatus is provided. The display apparatus includes: a display including a front surface configured to display an image and a rear surface provided with a mounting groove; a rotation module including at least one body that is configured to couple to the display by being inserted into the mounting groove, the rotation module further including a drive motor configured to provide a driving force to rotate the display about an axis perpendicular to the front surface and the rear surface of the display; and a bracket configured to be mounted on a stand or a wall and to which the rotation module is coupled, wherein the display and the rotation module are configured to lock together by the display and the rotation module being coupled.

According to an embodiment, the mounting groove includes a coupling protrusion that protrudes from one surface of the mounting groove, and the at least one body of the rotation module includes a coupling groove in which the coupling protrusion is inserted.

According to an embodiment, the at least one body of the rotation module includes a coupling including the coupling groove, and the coupling is configured to be rotatable within a predetermined range.

According to an embodiment, the coupling is configured to be rotated in a first direction such that the coupling protrusion is inserted into the coupling groove when the display and the rotation module are coupled together, and the coupling is configured to be rotated in a second direction opposite to the first direction such that the coupling protrusion is removed from the coupling groove when the display and the rotation module are separated.

According to an embodiment, the display apparatus further includes a rotating bracket including the mounting groove, the rotating bracket configured to be mounted on the rear surface of the display.

According to an embodiment, the rotation module is configured to be coupled to or separated from the bracket without a separate tool.

According to an embodiment, the rotation module further includes a fixed plate configured to be coupled to the bracket by being rotated in a first direction about the bracket and configured to be separated from the bracket by being rotated in a second direction opposite to the first direction about the bracket, wherein the at least one body of the rotation module includes a rotating plate coupled to the fixed plate and configured to be rotated in the first direction or the second direction about the fixed plate.

According to an embodiment, the fixed plate includes the drive motor and at least one gear connected to the drive motor such that the at least one gear is configured to transmit the driving force of the drive motor, and the rotating plate is configured to connect to the at least one gear and be rotated by the at least one gear.

According to an embodiment, the display is configured to be coupled to or separated from the rotation module without a separate tool.

According to an embodiment, the display is configured to receive electric power from the rotation module.

According to an embodiment, the display is configured to receive electric power wirelessly.

According to an embodiment, an adapter configured to supply electric power received from an external power source, wherein the display includes: at least one processor configured to allow the electric power to be received from the adapter and to be supplied to the display through the rotation module.

According to an embodiment, the rotation module further includes: a wireless power supply configured to receive the electric power from the adapter and supply the electric power to the display; and a first sensor configured to obtain a signal of the display, and the display further includes: a second sensor configured to obtain a signal of the rotation module; and a wireless power receiver configured to receive the electric power from the wireless power supply, wherein the at least one processor is configured to allow the wireless power receiver to receive the electric power supplied from the wireless power supply based on a determination that the rotation module is coupled to the display based on the signal obtained by the second sensor.

According to an embodiment, wherein the at least one body of the rotation module includes a first electrode including a first contact point that is configured to come in contact with a second contact point of the display by the display and the rotation module being coupled, the display includes a second electrode including the second contact point, and the at least one processor is configured to allow the electric power to be supplied to the display through the first electrode and the second electrode based on a determination that the rotation module is coupled to the display based on a signal exchanged between the first electrode and the second electrode.

According to an embodiment, the adapter and the rotation module are integrally provided, and the rotation module further includes a converter configured to convert the electric power that is received by the adapter to direct current power corresponding to the display.

According to one or more embodiments, a display apparatus is provided. The display apparatus includes: a display including a front surface configured to display an image; a rotating bracket configured to be mounted on a rear surface of the display and including a mounting groove; and a rotation module including at least one body that is configured to be coupled to the rotating bracket by being inserted into the mounting groove, and further including a drive motor configured to provide a driving force so as to rotate the rotating bracket, wherein the rotating bracket and the rotation module are configured to lock together by the rotating bracket and the rotation module being coupled.

According to an embodiment, the display apparatus further includes: a bracket configured to be mounted on a stand or a wall, wherein the rotation module is configured to be coupled to the bracket.

According to an embodiment, the display is configured to receive electric power from the rotation module.

According to one or more embodiments, a rotation module configured to be coupled to a rotating bracket mounted on a rear surface of a display is provided. The rotation module including: a fixed plate including a drive motor and at least one gear connected to the drive motor such that the at least one gear is configured to transmit a driving force of the drive motor; and a rotating plate configured to connect to the at least one gear and be rotated by the at least one gear and further configured to be coupled to the rotating bracket.

According to an embodiment, the fixed plate is configured to be mounted on a stand or a wall.

According to one or more embodiments, an apparatus is provided. The apparatus including: a rotating bracket including a mounting groove with a coupling protrusion, the rotating bracket configured to mount on a rear surface of a display; and a rotation module configured to be coupled to the rotating bracket, the rotation module including: at least one body configured to couple to the rotating bracket by being inserted into the mounting groove of the rotating bracket; and a drive motor configured to rotate the at least one body to rotate the display about an axis perpendicular to a front surface of the display.

According to an embodiment, the at least one body of the rotation module includes: a coupling groove that is configured to be rotated such that the coupling protrusion of the rotating bracket is coupled to the coupling groove. According to an embodiment, the mounting groove of the rotating bracket has a size, in a linear direction that is perpendicular to an insertion direction of the rotation module into the mounting groove, that is greater than a size of the rotation module in the linear direction, and the at least one body of the rotation module is configured to couple to the rotating bracket by moving in the linear direction while inside the rotation module.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
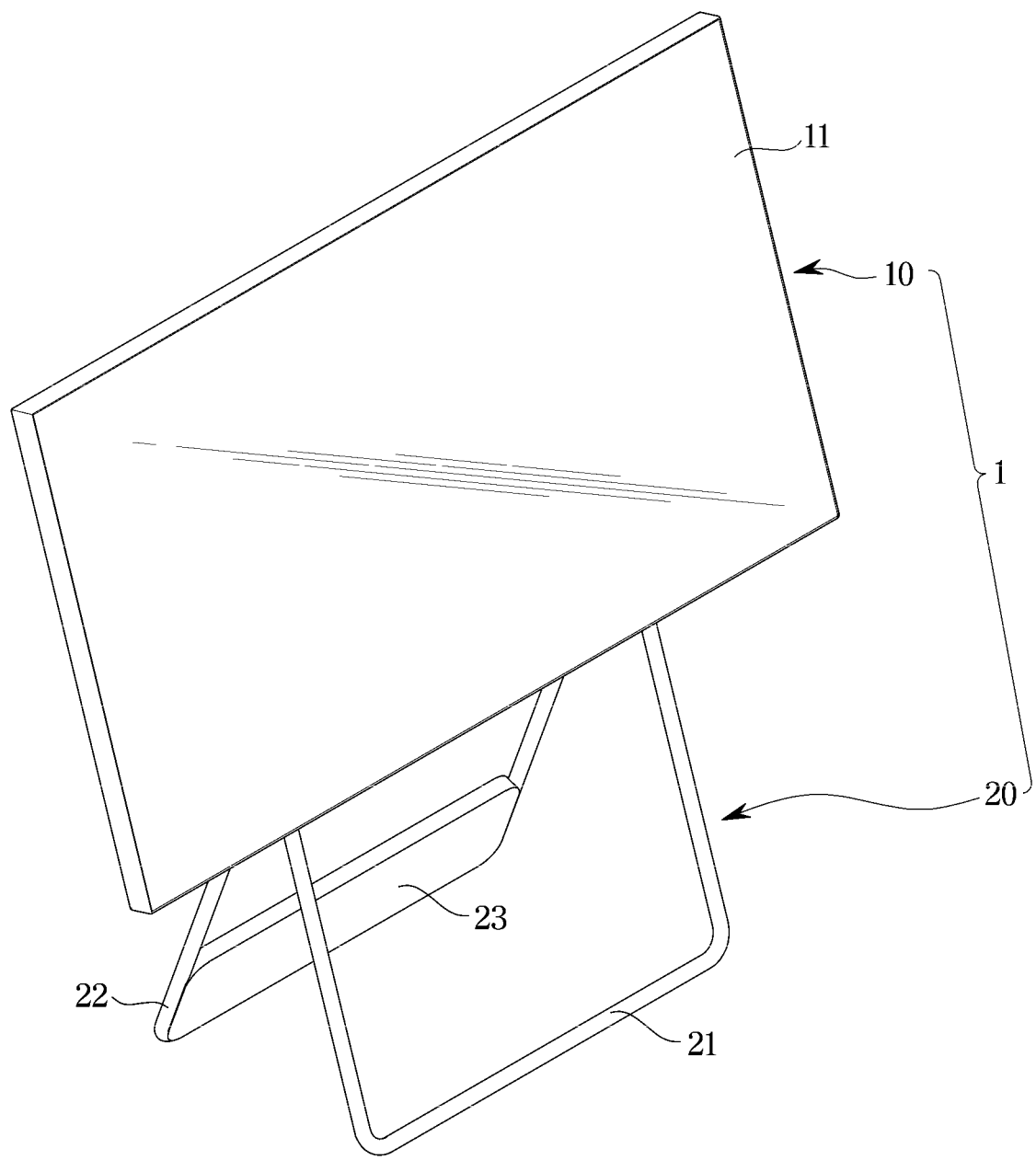
FIG. 1 is a perspective view of a display apparatus according to an embodiment of the disclosure, illustrating a state in which a display module is coupled to a stand.

Embodiments described in the disclosure and configurations shown in the drawings are merely examples of embodiments of the disclosure, and may be modified in various different ways at the time of filing of the present application to replace the embodiments and drawings described and shown in the disclosure.

Also, the terms used herein are used to describe embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the description, a supporter may refer to a bracket or a stand including a bracket.

Embodiments of the disclosure will be described more fully hereinafter with reference to the accompanying drawings.

Figure 2:
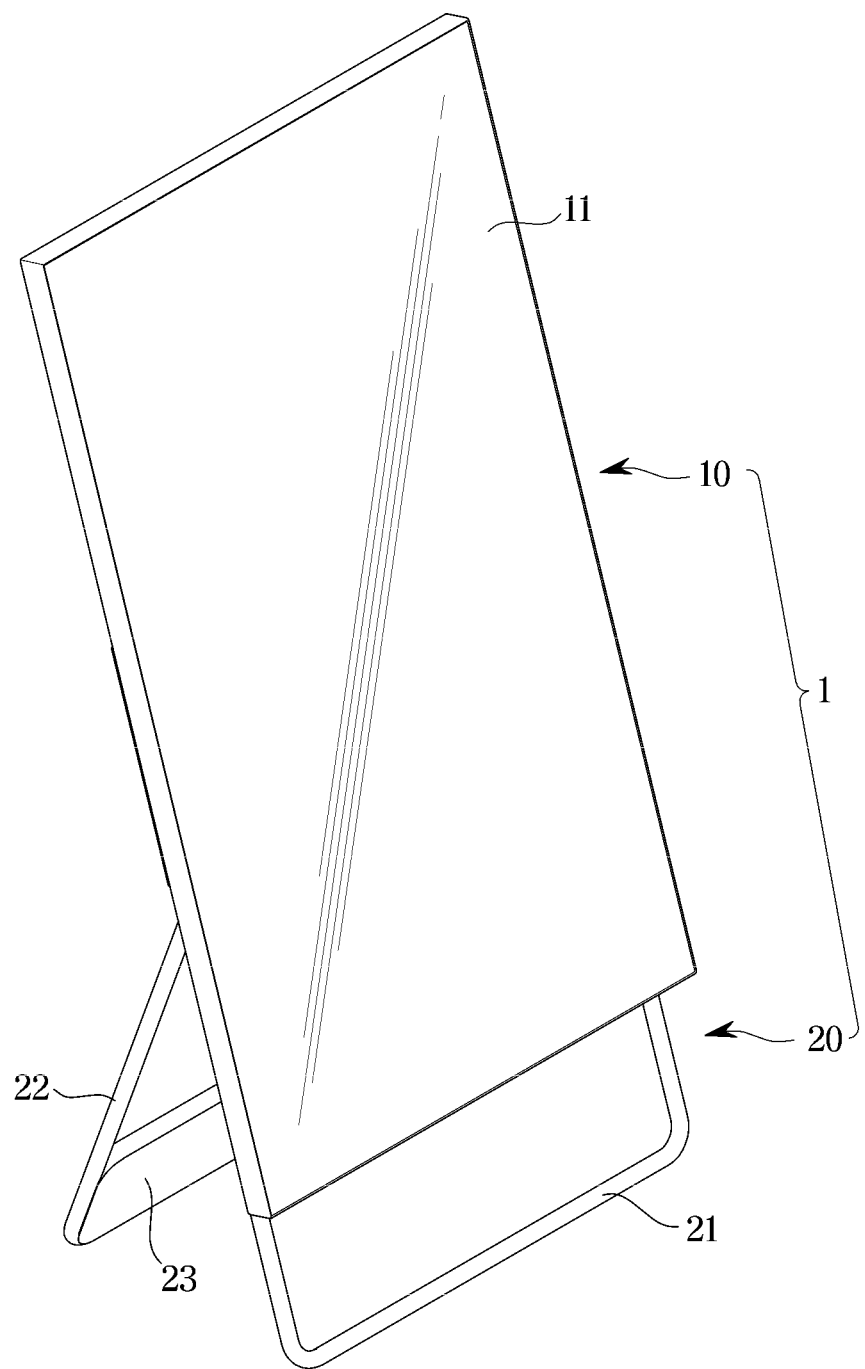
FIG. 2 is a view illustrating a state in which the display module is vertically arranged in the display apparatus of FIG. 1.

FIG. 1 is a perspective view of a display apparatus according to an embodiment of the disclosure, illustrating a state in which a display module is coupled to a stand and FIG. 2 is a view illustrating a state in which the display module is vertically arranged in the display apparatus of FIG. 1.

Referring to FIG. 1, a display apparatus 1 may include a display module 10 (e.g. a display) configured to display a screen and a stand 20 coupled to a rear of the display module 10 to support the display module 10.

The display module 10 is a device that displays information, materials, and data as text, graphics, graphs, and images, and may include a television and a monitor.

The display module 10 may be configured to display a screen. The display module 10 may include a self-luminous display panel (not shown) such as an organic light emitting diode (OLED) panel, or a non-self-luminous display panel (not shown) such as a liquid crystal display (LCD) panel, but is not limited thereto. Therefore, the display module may include a variety of display modules.

The display module 10 may be provided in such a way that a horizontal length is different from a vertical length. That is, the display module 10 may be configured to have a long side and a short side. The display module 10 may be provided in a rectangular plate shape.

The display module 10 may be provided in various sizes. In addition, the ratio of the long side to the short side of the display module 10 may vary, unlike a ratio of the general display module such as 16:9 and 4:3. However, it is appropriate that the display module 10 is not in a square shape because the display module 10 is provided to be rotatable as will be described later. This is because in the case of a square, there may be no real benefit of rotation of the display module 10.

The stand 20 may be coupled to the rear of the display module 10 to support the display module 10. Although not shown in FIG. 1, a rotation module 100 may be removably coupled to the stand 20. The display module 10 may be coupled to the stand 20 by being coupled to the rotation module 100 coupled to the stand 20.

The display module 10 is self-standing on a floor by being coupled to the stand 20. The stand 20 may be provided in various forms. For example, as shown in FIGS. 1 and 2, the stand 20 may be formed by bending a pipe. Through this, it is possible to reduce the material cost of the stand 20, and it is possible to make the stand 20 lighter.

When the display module 10 is coupled to the stand 20, a load may be concentrated on a front leg 21 of the stand 20, which may cause the display apparatus 1 to fall forward. To prevent this, a weight balancer 23 configured to hold the center of gravity of the display apparatus 1 may be provided at a lower end of a rear leg 22 of the stand 20.

According to the disclosure, the display module 10 may be configured to be rotatable. The display module 10 may be rotated from a horizontal mode in which a long side is horizontally arranged to a vertical mode in which a short side is horizontally arranged. Further, the display module 10 may be rotated from the vertical mode to the horizontal mode. As shown in FIGS. 1 and 2, when the display apparatus 1 is used as a stand type, the display module 10 may be rotated from the horizontal mode to the vertical mode or from the vertical mode to the horizontal mode. Hereinafter when the display module 10 is arranged in the horizontal mode, it is assumed that the display module 10 is located in a first position. When the display module 10 is arranged in the vertical mode, it is assumed that the display module 10 is located in a second position. The display module 10 may be provided to be rotated around an axis perpendicular to a screen display area 11. Hereinafter the screen display area 11 is referred to as a front surface of the display module 10.

A user may selectively arrange the display module 10 in the vertical mode or the horizontal mode according to an aspect ratio of an image.

Conventionally, a display module is generally fixed in a horizontal state. When a vertical image is displayed on a conventional display module, nothing is displayed on opposite sides of the screen, and thus the screen of the display module may not be efficiently used. Recently, because both vertical and horizontal images are used, a display apparatus configured to efficiently display various aspect ratios has been required.

According to embodiments of the disclosure, the display apparatus 1 may arrange the display module 10 in the vertical mode upon displaying a vertical image, and the display apparatus 1 may arrange the display module 10 in the horizontal mode upon displaying a horizontal image, thereby effectively using the screen display area 11. Therefore, the display apparatus 1 according to an embodiment may efficiently display various aspect ratios.

Figure 3:
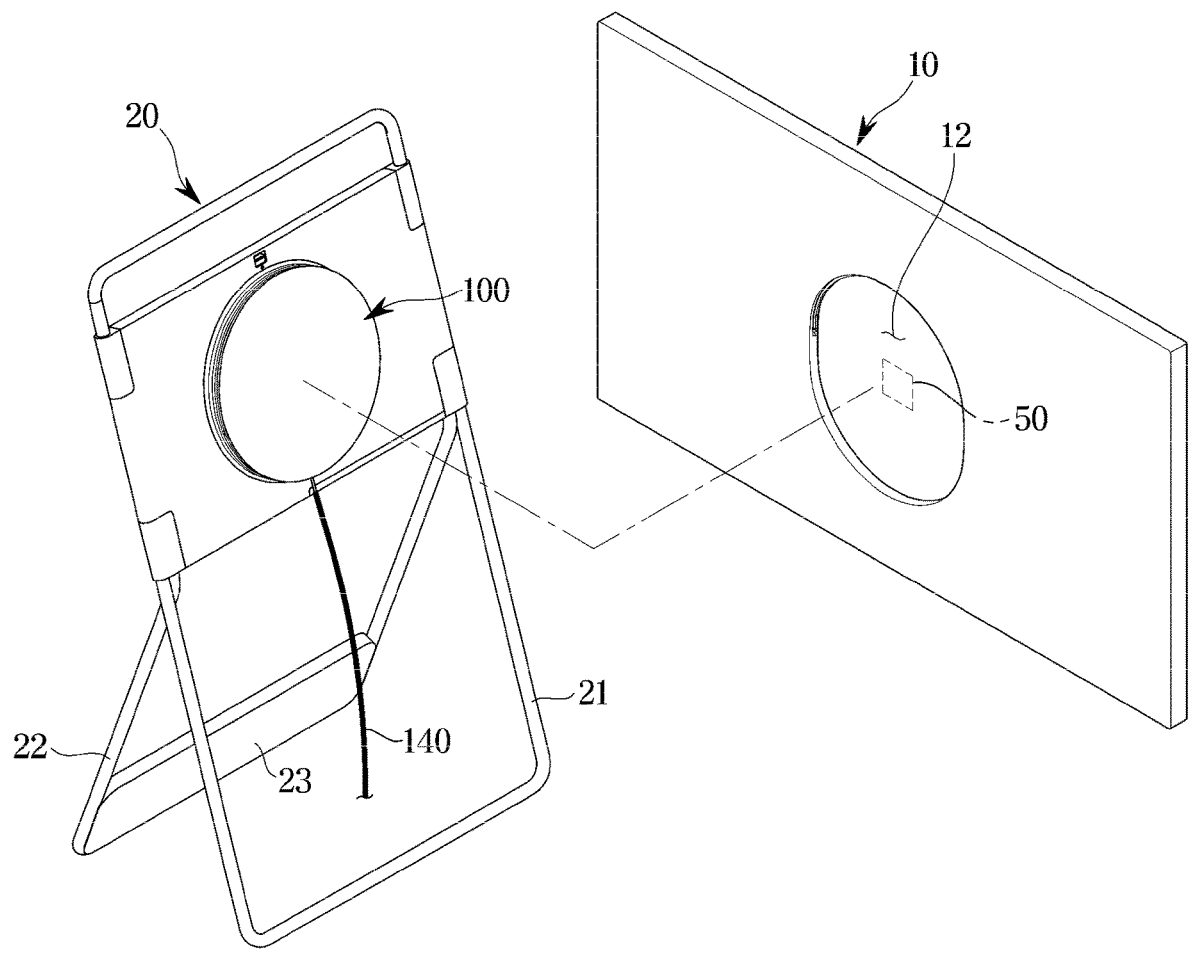
FIG. 3 is a view illustrating a state in which the display module is separated from a rotation module in the display apparatus of FIG. 1.
Figure 4:
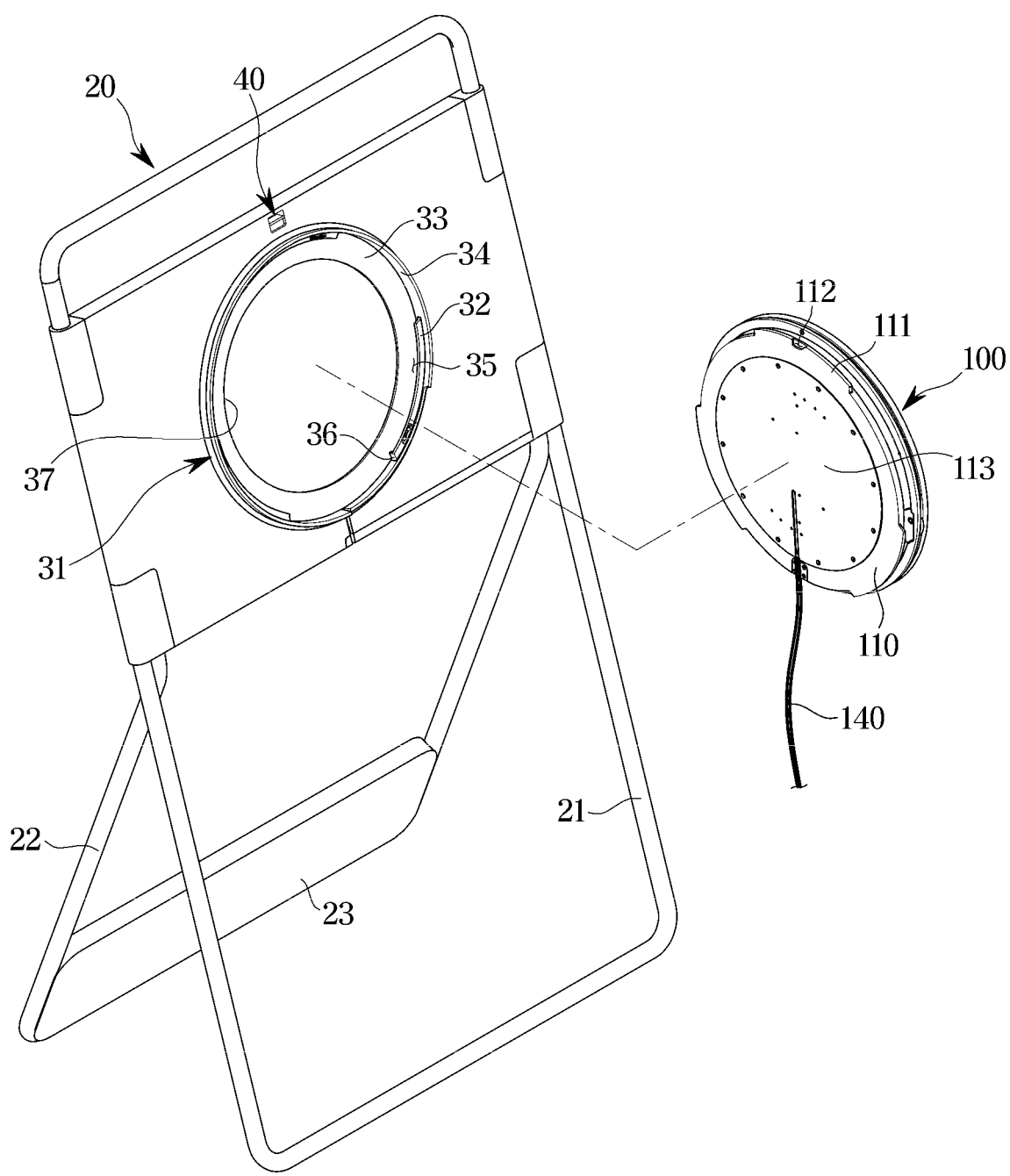
FIG. 4 is a view illustrating a state in which the rotation module is separated from the stand in the display apparatus of FIG. 3.

FIG. 3 is a view illustrating a state in which the display module is separated from a rotation module in the display apparatus of FIG. 1, and FIG. 4 is a view illustrating a state in which the rotation module is separated from the stand in the display apparatus illustrated of FIG. 3.

Referring to FIGS. 3 and 4, the display apparatus 1 according to an embodiment of the disclosure may include the display module 10 configured to display an image, the rotation module 100 configured to rotatably support the display module 10, and the stand 20 configured to support the display module 10 coupled to the rotation module 100.

As illustrated in FIG. 3, the display module 10 may be separated from the stand 20. Particularly, the display module 10 may be separated from the rotation module 100 coupled to the stand 20. The display module 10 may be provided in a wireless manner, as shown in the drawings. In addition, the display module 10 may be separated from the rotation module 100 or coupled to the rotation module 100 without a separate tool or a fastening member. A specific coupling structure of the display module 10 and the rotation module 100 will be described later.

A user can separate the display module 10 from the stand 20 and the rotation module 100 with bare hands, that is, without tools. In addition, because the display module 10 is provided in the wireless manner, there is no fear of twisting a line in the process in which the user separates the display module 10. Therefore, the user can separate the display module 10 and move the display module or store the display module 10 separately as needed. For example, as for the display apparatus 1 installed as a stand type in a living room with children, the display module 10 may be separated and stored in a space separated from the living room. In this case, the user can couple the display module 10 to the stand 20 and the rotation module 100 only when the user wants to watch an image. In addition to the above example, the display apparatus 1 may be used in various ways. According to embodiments of the disclosure, the usability of the display apparatus 1 may be improved because the display module 10 is configured to be easily detachable from the stand 20.

In addition, according to embodiments of the disclosure, the rotation module 100 may be configured to be coupled to or separated from the display module in various sizes. When a plurality of the display module 10 having various sizes is provided, any one of the plurality of the display module 10 may be selectively coupled to the rotation module 100. The rotation module 100 may be provided to be compatible with the plurality of the display module 10 in various sizes. Due to the compatibility of the rotation module 100, the productivity of the display apparatus 1 may be improved.

In addition, according to embodiments of the disclosure, the rotation module 100 may be coupled to various types of display modules. The rotation module 100 may be coupled to a display module including a self-luminous display panel, and may also be coupled to a display module including a non-self-luminous display panel.

In addition, according to the disclosure, the rotation module 100 may be configured to be coupled to the display module 10 to supply power to the display module 10 by wire or wirelessly. This will be described in detail later.

Referring to FIG. 4, the rotation module 100 according to an embodiment of the disclosure may be separated from the stand 20. The rotation module 100 may be separated from the stand 20 without a separate tool or a fastening member. In addition, the rotation module 100 may be coupled to the stand 20 without a separate tool or a fastening member.

Although not shown in FIG. 4, the stand 20 may include a bracket 30 (refer to FIG. 7) to be described later. With reference to FIG. 4, the bracket 30 may be provided integrally with the stand 20. However, the disclosure is not limited thereto, and the bracket 30 may be detachable from the stand 20. Also, the bracket 30 may be coupled to the stand 20 by fastening a fastening member S (refer to FIG. 8) such as a screw. In addition, the bracket 30 may be separated from the stand 20 by separating the fastening member. According to embodiments of the disclosure, the bracket provided on the stand 20 and the bracket 30 provided to be mounted on the wall W (refer to FIGS. 6-7) may have the same configuration. That is, one bracket 30 may be selectively mounted on the stand 20 or mounted on the wall W.

According to an embodiment of the disclosure, the rotation module 100 may be coupled to or separated from the stand 20 by rotation thereof.

The rotation module 100 may be rotated at a predetermined angle in a first direction with respect to the stand 20, thereby being coupled to the stand 20. The rotation module 100 may be rotated at a predetermined angle in a second direction opposite to the first direction with respect to the stand 20, thereby being separated from the stand 20. According to an embodiment of the disclosure, the first direction may represent the clockwise direction and the second direction may represent the counterclockwise direction.

The rotation module 100 may include a fixed plate 110 coupled by being rotated with respect to the bracket 30.

The fixed plate 110 may be provided in a disc shape. The fixed plate 110 may include a guide protrusion 111 protruding in a radial direction of the fixed plate 110 and extending along a circumferential direction of the fixed plate 110. The guide protrusion 111 may be provided in plural. The plurality of the guide protrusion 111 may be arranged to be spaced apart from each other along the circumferential direction of the fixed plate 110. According to an embodiment of the disclosure, three of the guide protrusion 111 may be provided, and the three of the guide protrusion 111 may be spaced apart every 120° along the circumferential direction of the fixed plate 110.

The bracket 30 which is coupled to the stand 20 or is integrally provided with the stand 20 may be configured to be coupled to the fixed plate 110 of the rotation module 100. The bracket 30 (refer to FIG. 8) may include a plate coupling portion 31 provided in a cylindrical shape having at least one surface open. The fixed plate 110 may be inserted into an open surface of the plate coupling portion 31. The fixed plate 110 may be inserted into the plate coupling portion 31 and rotated at a predetermined angle in the first direction, thereby being coupled to the bracket 30.

Hereinafter when the plate coupling portion 31 is a cylinder, a bottom surface 33 and a side surface 34 of the plate coupling portion 31 refer to the bottom and side surfaces of the cylinder, respectively.

The plate coupling portion 31 may include a guide rib 32 provided to correspond to the guide protrusion 111 of the fixed plate 110. The guide rib 32 may be provided on the side surface 34 of the plate coupling portion 31. The guide rib 32 may protrude radially inward of the plate coupling portion 31 from the side surface 34 and may extend along the circumferential direction of the side surface 34. A plurality of the guide rib 32 may be spaced apart from each other along the circumferential direction of the plate coupling portion 31. The plurality of the guide rib 32 may be provided to correspond to the plurality of the guide protrusion 111.

The guide rib 32 may be spaced apart from the bottom surface 33 of the plate coupling portion 31. Accordingly, a guide groove 35 may be formed between the guide rib 32 and the bottom surface 33. The guide protrusion 111 may be inserted into the guide groove 35. As the guide protrusion 111 is inserted into the guide groove 35, the fixed plate 110 may be coupled to the plate coupling portion 31.

The plate coupling portion 31 may further include a stopper 36 configured to limit a rotation range of the guide protrusion 111 in the first direction. The stopper 36 may extend from one end of the guide rib 32 toward the bottom surface 33.

The plate coupling portion 31 may further include a through hole 37 provided to penetrate the bottom surface 33. A protrusion 113 of the fixed plate 110 provided in a size corresponding to the through hole 37 may be inserted into the through hole 37. A receiving space 110a (refer to FIG. 9) of the fixed plate 110 may be increased due to the protrusion 113. By inserting the protrusion 113 into the through hole 37, a thickness of the rotation module 100 protruding from the bracket 30 may be reduced. That is, a total thickness of the rotation module 100 and the bracket 30 may be reduced.

According to an embodiment of the disclosure, because the guide protrusion 111 is arranged between a pair of the guide rib 32 adjacent to each other, the fixed plate 110 may be inserted into the plate coupling portion 31. As described above, after the fixed plate 110 is inserted into the plate coupling portion 31 and the fixed plate 110 is rotated in the first direction, the guide protrusion 111 may be inserted into the guide groove 35, and the fixed plate 110 may be coupled to the plate coupling portion 31.

The bracket 30 may further include a locking member 40. The locking member 40 may linearly reciprocate relative to the bracket 30. The locking member 40 may include a locking protrusion 41 (refer to FIG. 8) configured to be inserted into a locking groove 112 provided in any one of the plurality of the guide protrusion 111. When the locking protrusion 41 is inserted into the locking groove 112, the fixed plate 110 may be locked without being rotated relative to the plate coupling portion 31. When a user moves the locking member 40 to take the locking protrusion 41 from the locking groove 112, the fixed plate 110 may be rotatable relative to the plate coupling portion 31, and the fixed plate 110 may be separated from the plate coupling portion 31. According to an embodiment of the disclosure, a user can remove the locking protrusion 41 from the locking groove 112 by moving the locking member 40 upward.

Referring to FIG. 4, the rotation module 100 according to an embodiment of the disclosure may be connected to an external power source (not shown) through a wire 140. The rotation module 100 may be electrically connected to the external power source through the wire 140 to receive power from the external power source.

According to an embodiment of the disclosure, the rotation module 100 may include a wireless power supply module 150 (e.g. a wireless power supply) (refer to FIG. 9), and the display module 10 may include a wireless power receiving module 50 (e.g. a wireless power receiver) (refer to FIG. 3). Accordingly, the display module 10 may be wirelessly powered without a separate wire connected to the external power source (not shown). Therefore, the display module 10 may be provided in the wireless manner.

When the display module 10 is configured to receive power wirelessly from the rotation module 100, the display module 10 may include a battery (not shown) for stable power supply of the display module 10. The display module 10 may include a battery therein. The battery (not shown) may be connected to the wireless power receiving module 50 to receive power from the wireless power receiving module 50. Power supplied from the wireless power supply module 150 of the rotation module 100 to the wireless power receiving module 50 of the display module 10 may be supplied to the battery from the wireless power receiving module 50.

The battery may receive power even when the display module 10 is not operated. In addition, the battery may supply power to the display module 10 for a predetermined period even if the battery does not receive power from the wireless power receiving module 50. Therefore, even when the power transmission between the wireless power supply module 150 and the wireless power receiving module 50 is temporarily cut off, the battery may supply power to the display module 10 and thus the display module 10 may be stably operated without stopping.

Further, according to another embodiment of the disclosure, the display module 10 may be provided in the wireless manner, but may not include a wireless power receiving module. The rotation module 100 may not include a wireless power transmission module. According to another embodiment of the disclosure, the rotation module 100 and the display module 10 may include fasteners 135 and 16 (refer to FIG. 13) in physical contact with each other. Power may be transferred from the rotation module 100 to the display module 10 through the fasteners 135 and 16.

According to embodiments of the disclosure, the display module 10 may be wirelessly paired with a mobile device (not shown). The mobile device and the display module 10 may be paired through various methods including a Bluetooth method. When the mobile device and the display module 10 are paired, the display module 10 may be rotated as the mobile device is rotated. For example, when the mobile device is horizontally arranged, the display module 10 may be arranged in the horizontal mode, and when the mobile device is vertically arranged, the display module 10 may be arranged in the vertical mode. For this, when the mobile device is rotated, the display module 10 may be also rotated from the horizontal mode to the vertical mode or from the vertical mode to the horizontal mode.

Further, the display module 10 may be configured to be rotated when a rotation button (not shown) provided on a remote control (not shown) is pushed. Particularly, when a user pushes the rotation button once, the display module 10 may be rotated 90° in the clockwise direction. The display module 10 may be configured to be rotatable 360° in the clockwise or counterclockwise direction. According to the setting, when the rotation button is pushed once, the display module 10 may be rotated 90° counterclockwise. In addition, when the rotation button is pushed twice in series, the display module 10 may be rotated 90° in a direction opposite to a direction that is rotated when the rotation button is pushed once.

Figure 5:
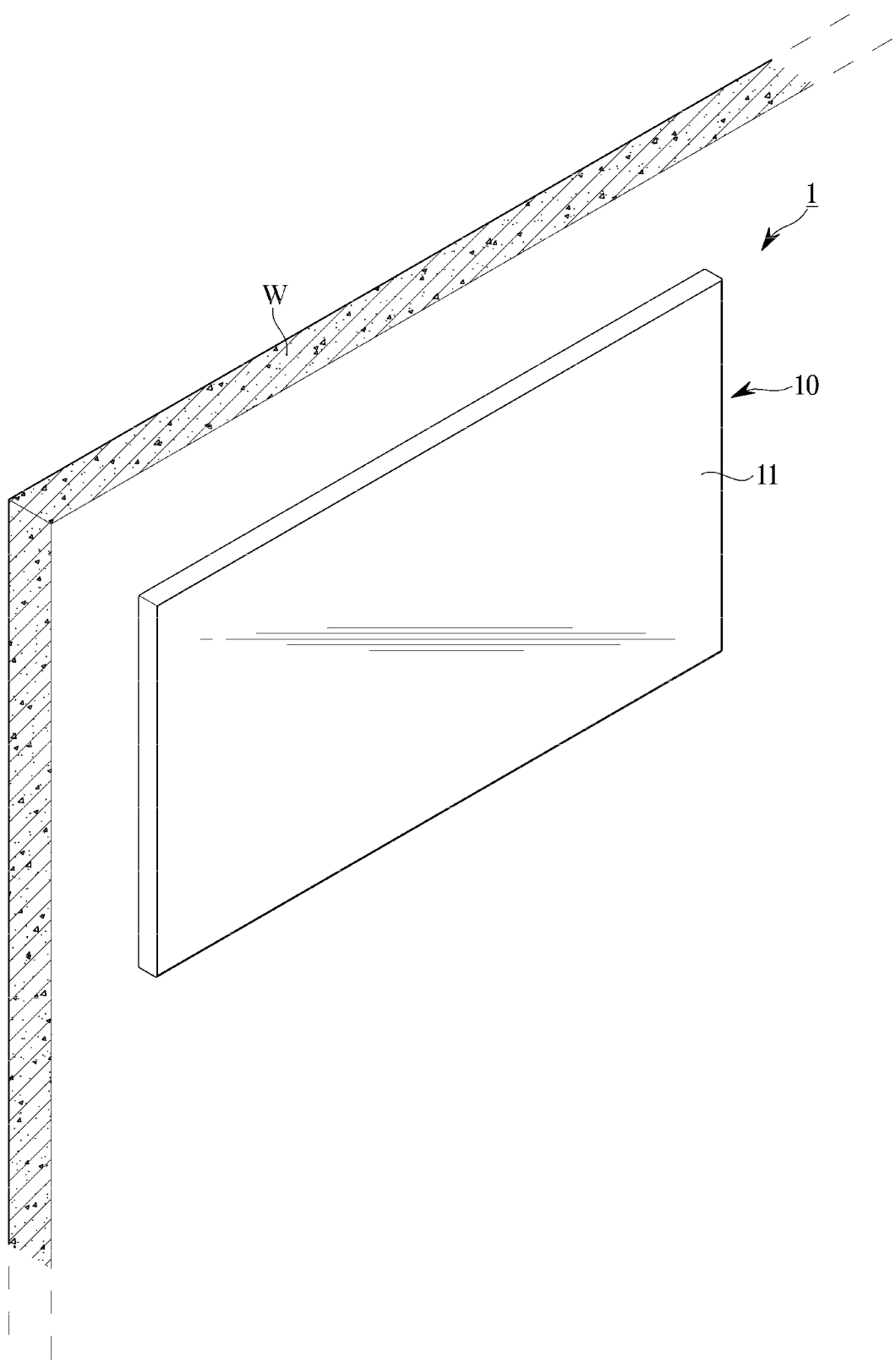
FIG. 5 is a perspective view of the display apparatus according to an embodiment of the disclosure, illustrating a state in which the display module is mounted on a wall.
Figure 6:
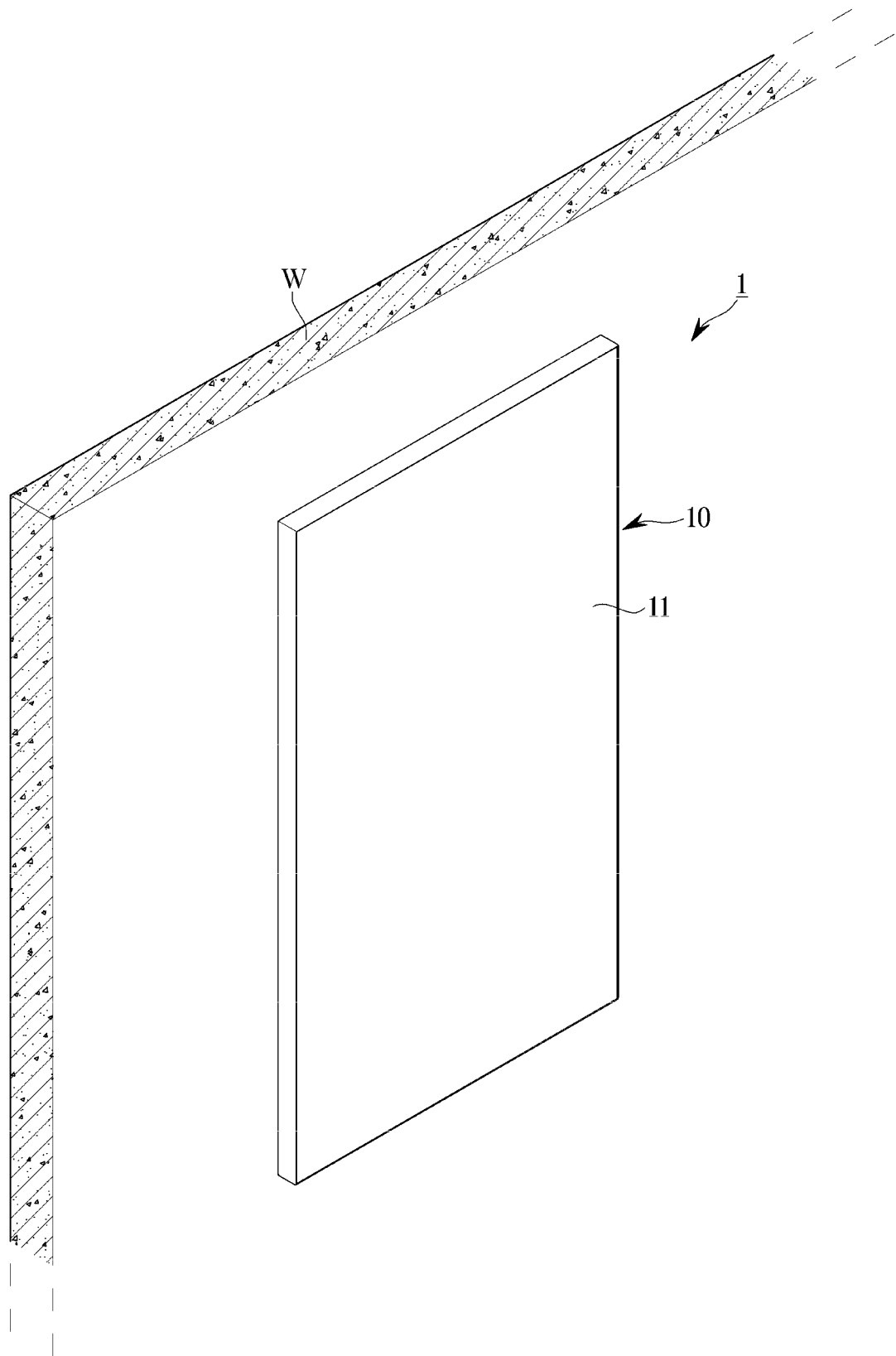
FIG. 6 is a view illustrating a state in which the display module is vertically arranged in the display apparatus of FIG. 5.
Figure 7:
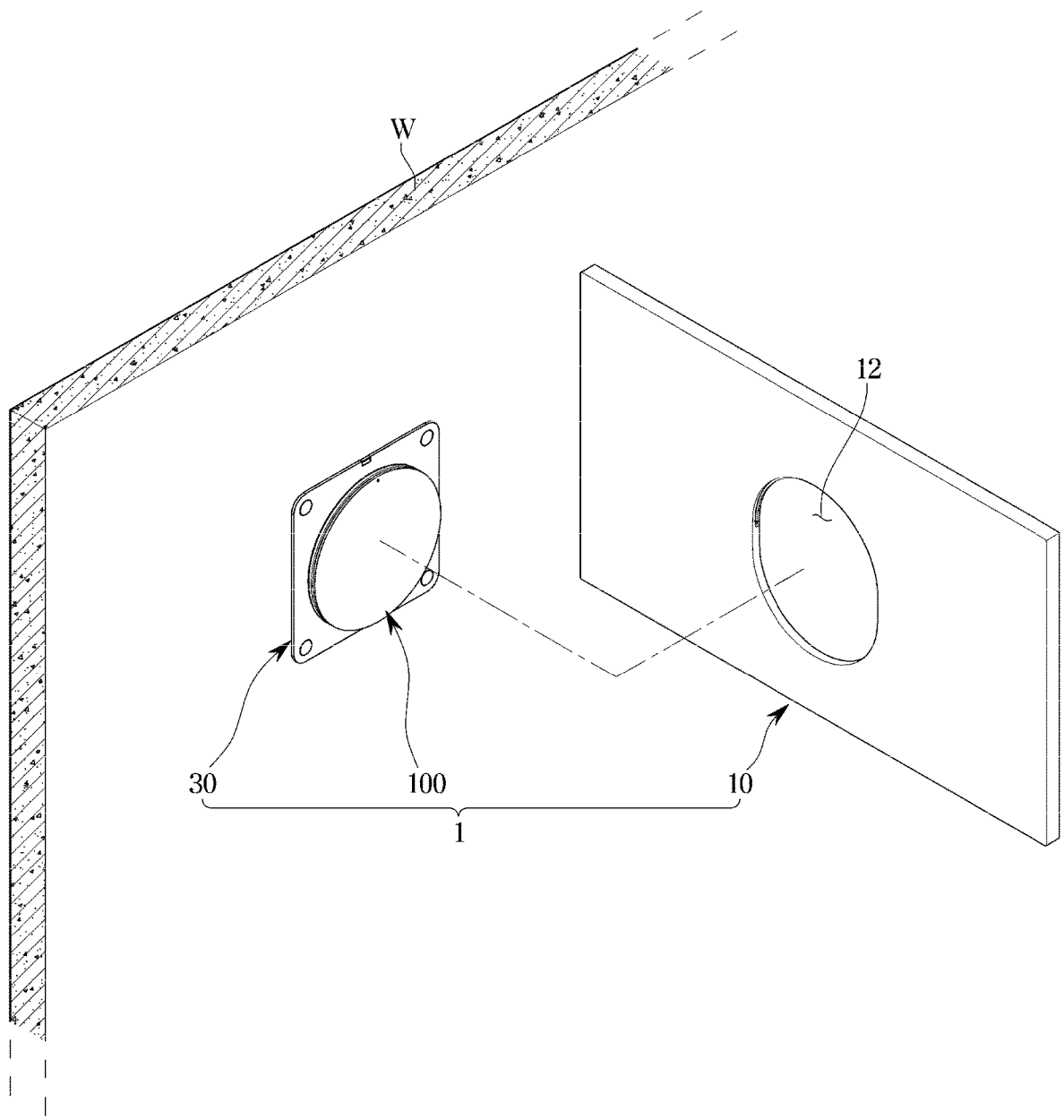
FIG. 7 is a view illustrating a state in which the display module is separated from the rotation module in the display apparatus of FIG. 5.
Figure 8:
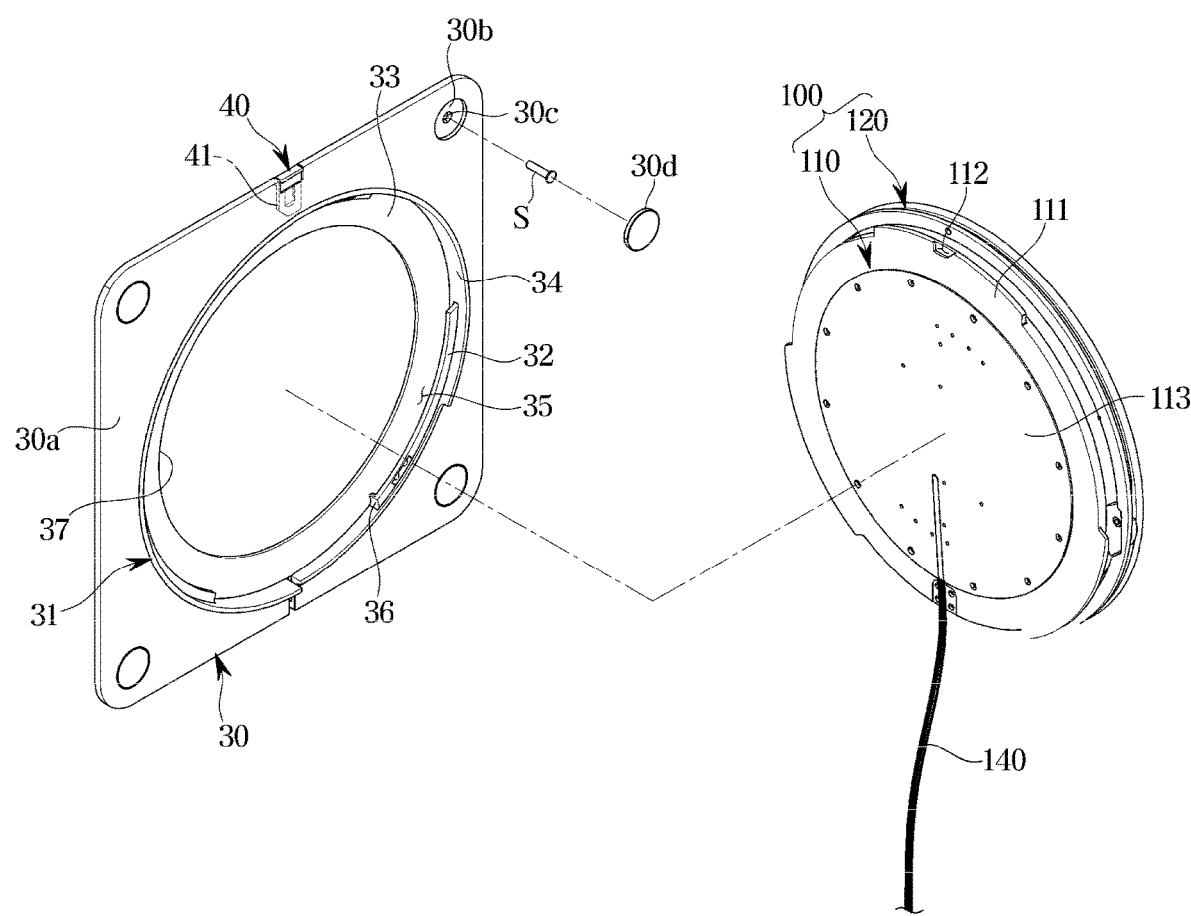
FIG. 8 is a view illustrating a state in which the rotation module is separated from a bracket in the display apparatus of FIG. 7.

FIG. 5 is a perspective view of the display apparatus according to an embodiment of the disclosure, illustrating a state in which the display module is mounted on a wall, FIG. 6 is a view illustrating a state in which the display module is vertically arranged in the display apparatus of FIG. 5, FIG. 7 is a view illustrating a state in which the display module is separated from the rotation module in the display apparatus of FIG. 5, and FIG. 8 is a view illustrating a state in which the rotation module is separated from a bracket in the display apparatus of FIG. 7.

Referring to FIGS. 5 and 6, the display apparatus 1 according to an embodiment of the disclosure may be used as the wall-mounted type. According to the disclosure, the display apparatus 1 may be used as the stand type as shown in FIGS. 1 and 2, and may also be used as the wall-mounted type as shown in FIGS. 5 and 6. The display apparatus 1 may be configured to be rotatable from the horizontal mode to the vertical mode or from the vertical mode to the horizontal mode regardless of the type.

In general, a display apparatus may be used as either the wall-mounted type or the stand type. A display apparatus configured to select either the wall-mounted type or the stand-type is disclosed. However, it may be required to separate or fasten a fastening member to change the type in the case of such a display apparatus, and thus the display apparatus may be usually used in any one type.

According to embodiments of the disclosure, the display apparatus 1 may be used as either the wall-mounted type or the stand-type. In addition, the display apparatus 1 may be changed from the wall-mounted type to the stand-type without fastening and separation of fastening member or a separate tool, and further, the display apparatus 1 may be changed from the stand-type to the wall-mounted type.

Referring to FIGS. 3, 4, 7, and 8, the bracket 30 may be mounted on a wall W or mounted on the stand 20. As described above, the bracket may be provided integrally with the stand 20 so as not to be separated from the stand 20. Alternatively, the bracket may be provided to be detachably coupled to the stand 20. In the description, the wall W may be collectively referred to as an approximately vertical surface. Further, the wall W may be referred to as a wall that divides an interior space, or a vertical side of furniture. That is, the wall W may represent a substantially vertical surface on which the bracket 30 may be mounted.

In order to mount the bracket 30 on the wall W or the stand 20, the fastening member S (refer to FIG. 8) may be fastened. Particularly, a fastening groove 30b may be provided near the four corners of a plate portion 30a of the bracket 30, and a fastening hole 30c may be provided in the fastening groove 30b. A cover member 30d may be coupled to the fastening groove 30b to cover the fastening groove 30b to prevent the fastening member S and the fastening hole 30c from being exposed to the outside. Alternatively, the fastening groove 30b and the cover member 30d may be omitted.

As mentioned above, in order to mount the bracket 30 to the wall W or the stand 20, it may be required to fasten the fastening member S using a separate tool. In order to separate the bracket 30 from the wall W or the stand 20, it may be required to separate the fastening member S using a separate tool. Therefore, in order to freely change the display apparatus 1 from the wall-mounted type to the stand type or from the stand type to the wall-mounted type without a separate tool, it is appropriate that two of the bracket 30 may be provided so as to mount any one bracket to wall W and to mount the other bracket to the stand 20.

According to embodiment of the disclosure, the display module 10 may be separated from or coupled to the rotation module 100 without a separate tool. In addition, the rotation module 100 may be separated from or coupled to the bracket 30 without a separate tool. As described above, because the display module 10 is provided in the wireless manner, the display module 10 may be separated from the rotation module 100 without twisting or tangling a wire. Because the rotation module 100 is provided in a compact size in comparison with the display module 10, and a single wire 140 connecting the external power (not shown) to the rotation module 100 is provided, the rotation module 100 may be easily separated from or coupled to the bracket 30.

The display module 10 may be separated from the rotation module 100 in such a way that the display module 10 is set in a predetermined mode and the display module 10 is raised a predetermined distance in an upper side of the rotation module 100. This will be described later. According to an embodiment of the disclosure, the predetermined mode may be the horizontal mode, but is not limited thereto. In the vertical mode, the display module 10 may be coupled to or separated from the rotation module 100.

The rotation module 100 may be inserted into the bracket 30 and rotated at a predetermined angle in the first direction, thereby being coupled to the bracket 30. After the locking member 40 is moved to allow the locking protrusion 41 to be taken from the locking groove 112, the rotation module 100 may be rotated at a predetermined angel in the second direction opposite to the first direction, thereby being separated from the bracket 30.

Figure 9:
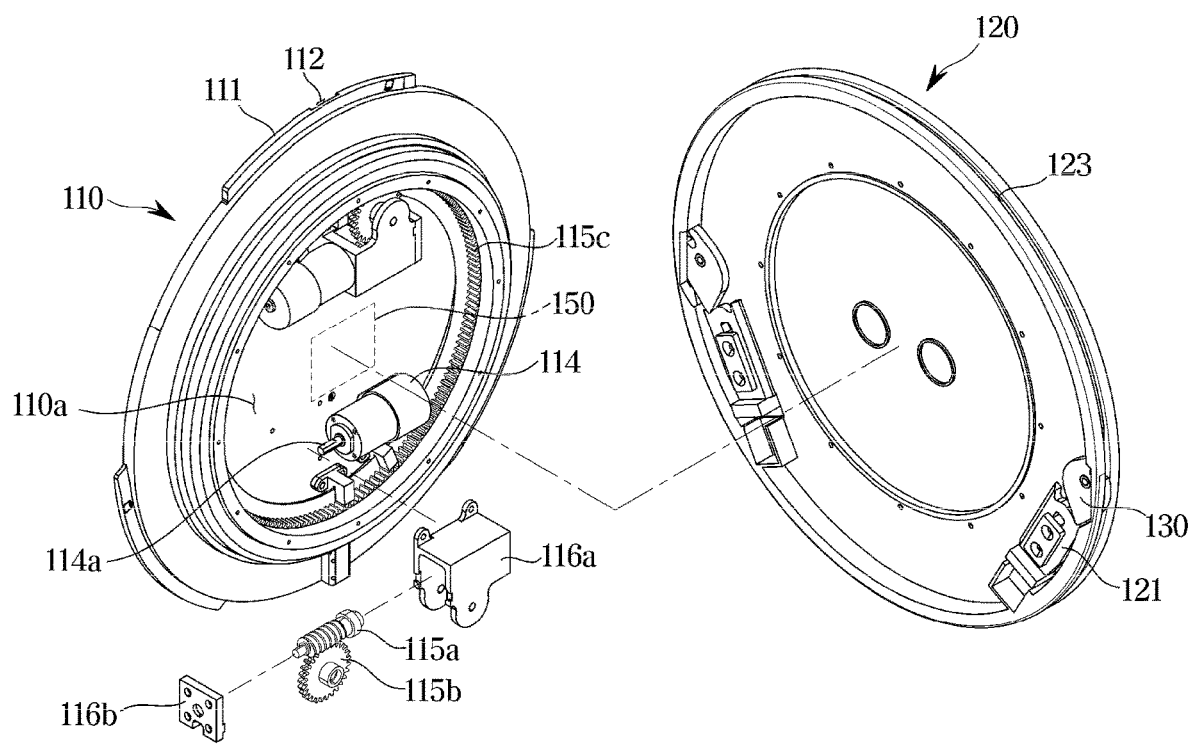
FIG. 9 is an exploded view of the rotation module in the display apparatus according to an embodiment of the disclosure.

FIG. 9 is an exploded view of the rotation module in the display apparatus according to an embodiment of the disclosure.

Hereinafter a structure of the rotation module according to an embodiment of the disclosure will be described in detail with reference to FIG. 9.

Referring to FIG. 9, the rotation module 100 according to an embodiment of the disclosure may include the fixed plate 110 coupled to the bracket 30 and a rotating plate 120 configured to be rotated relative to the fixed plate 110.

The fixed plate 110 may include the plurality of the guide protrusion 111 inserted into the guide groove 35 of the bracket 30 and the locking groove 112 provided on any one of the plurality of the guide protrusion 111. The fixed plate 110 may include the protrusion 113 (refer to FIG. 8) inserted into the through hole 37 of the bracket 30. Because the protrusion 113 protrudes from the fixed plate 110, it is possible to increase the receiving space 110a formed inside the fixed plate 110.

The fixed plate 110 may include a drive motor 114 disposed in the receiving space 110a, a power transmission unit configured to receive power from the drive motor 114 so as to rotate the rotating plate 120, and a fixing unit configured to fix the drive motor 114 and the power transmission unit to the receiving space 110a.

The power transmission unit may include a first gear 115a coupled to a drive shaft 114a of the drive motor 114, a second gear 115b engaged with the first gear 115a, and a third gear 115c engaged with the second gear 115b. The power transmission unit 115 may be referred to as a gear portion.

A rotation axis of the first gear 115a may not be parallel and may not intersect with a rotation axis of the second gear 115b. The first gear 115a may include a worm. The second gear 115b may include a worm gear. The second gear 115b may include a spur gear. Although not shown in the drawings, the second gear may be provided with two gears that share the shaft so as to transmit power smoothly. In this case, the second gear may include a worm connected to the first gear 115a and a spur gear connected to the third gear 115c.

The second gear 115b may be provided to be inscribed in the third gear 115c. The third gear 115c may include an internal gear. When the first gear 115a is rotated by the drive motor 114, the second gear 115b engaged with the first gear 115a may be rotated, and the third gear 115c engaged with the second gear 115*b* may be rotated. The third gear 115*c* may be engaged with the spur gear.

The fixing unit may include a first fixing unit 116*a* configured to fix the drive motor 114 and the second gear 115*b* to the receiving space 110*a*, and a second fixing unit 116*b* configured to fix one end of the first gear 115*a*.

According to an embodiment of the disclosure, the positions of the drive motor 114, the first gear 115*a*, and the second gear 115*b* may be fixed, and the third gear 115*c* may be rotatable. In addition, according to an embodiment of the disclosure, the drive motor 114, the power transmission unit and the fixing unit may be provided in pairs, respectively, so as to provide sufficient driving force.

The rotating plate 120 may be configured to be rotated together with the third gear 115*c* of the fixed plate 110. The rotating plate 120 may be coupled to the fixed plate 110 so as to cover the receiving space 110*a*.

According to an embodiment of the disclosure, the fixed plate 110 may be coupled to or separated from the bracket 30, and the rotating plate 120 may be coupled to or separated from the display module 10.

According to an embodiment of the disclosure, the display apparatus 1 may further include a locking device configured to prevent the display module 10 and the rotation module 100 from being separated when the display module 10 is coupled to the rotation module 100.

The locking device may be configured to lock the display module 10 to the rotation module 100 when the display module 10 is coupled to the rotation module 100. In addition, the locking device may be configured to release the locking of the display module 10 and the rotation module 100 when the display module 10 is separated from the rotation module 100.

Figure 10:
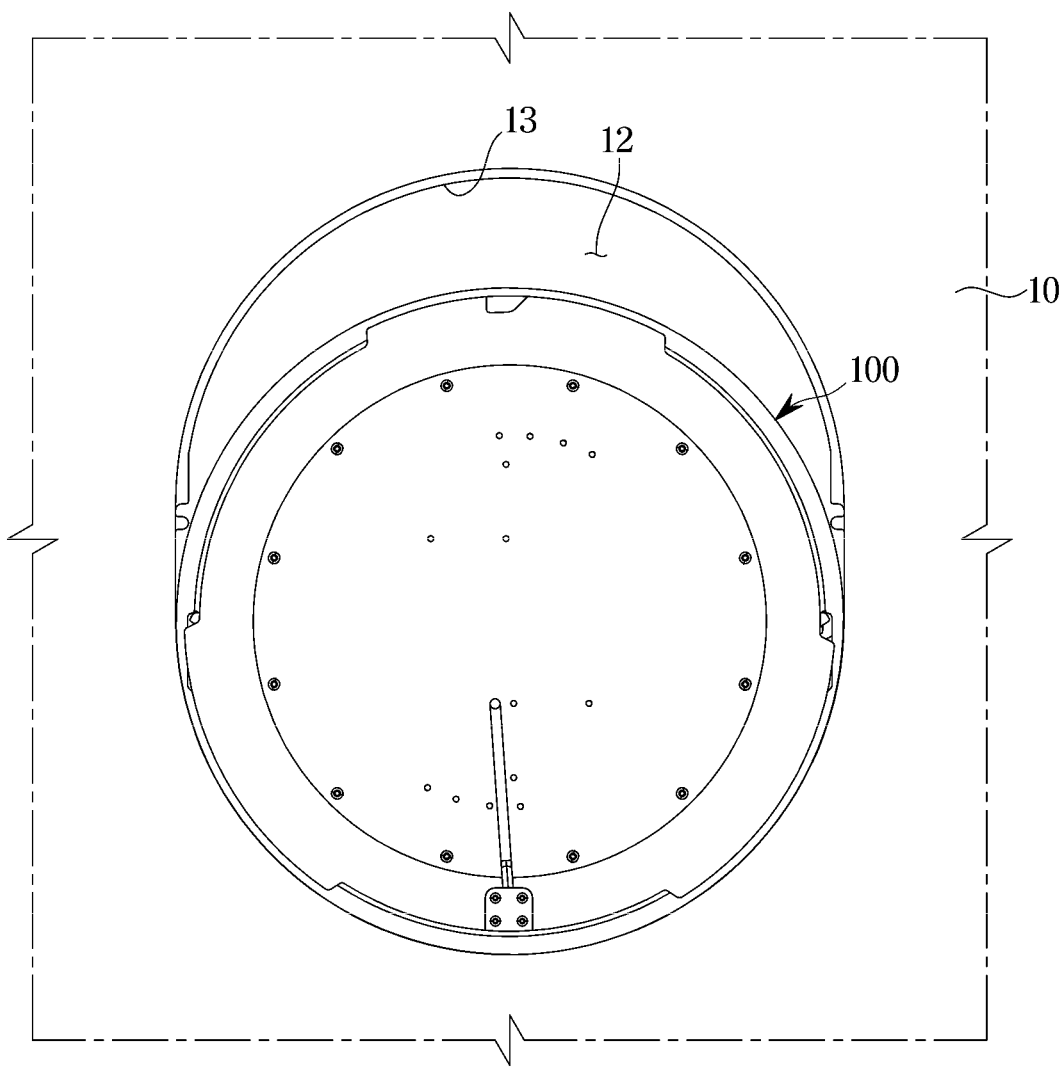
FIG. 10 is a view illustrating a rear surface of the display module and a rear surface of the rotation module in the display apparatus according to an embodiment of the disclosure, illustrating a state before the display module is coupled to the rotation module.

The locking device may include a coupling member 130 (e.g. a coupling) provided on the rotation module 100, a mounting groove 12 and a mounting protrusion 13 provided on the display module 10 (refer to FIG. 10). Particularly, referring to FIG. 11, the locking device may include a first coupling protrusion 134 and a first coupling groove 133 provided on the coupling member 130 and a second coupling protrusion 15 and a second coupling groove 14 provided on the rear surface of the display module 10.

The rotating plate 120 may include the coupling member 130 rotatably provided around a rotating shaft 131 within a predetermined angle range. The coupling member 130 may be provided in a pair. The rotating plate 120 may include a guide member 121 configured to limit the rotation range of the coupling member 130. The guide member 121 may include a guide surface 122 configured to limit the rotation range of the coupling member 130 and configured to guide the rotation of the coupling member 130. The guide member 121 may reciprocate within a predetermined movement range. By including an elastic member (not shown), the rotating plate 120 may elastically bias the guide member 121 to move the guide member 121 in one direction.

The rotating plate 120 may include a protrusion groove 123 (refer to FIG. 9) to which the mounting protrusion 13 of the display module 10 is inserted. The protrusion groove 123 may be formed along the circumferential direction of the rotating plate 120, and may be provided in an approximately semicircular shape. The protrusion groove 123 may be arranged on an upper end of the rotating plate 120 to correspond to the mounting protrusion 13 when the display module 10 is coupled to the rotation module 100.

Figure 11:
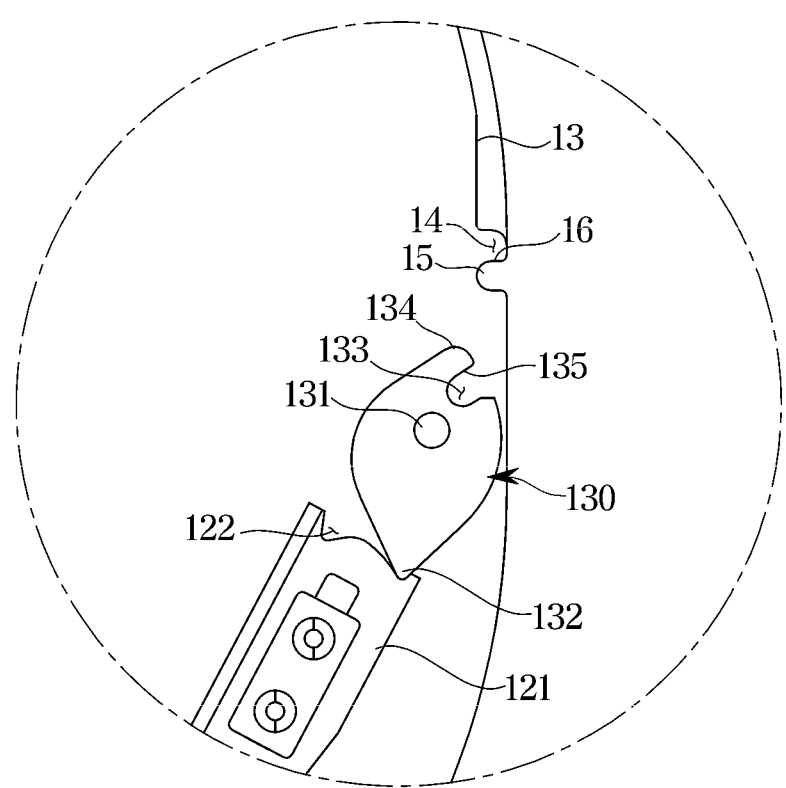
FIG. 11 is an enlarged view illustrating a part of the display module and the rotation module in the display apparatus of FIG. 10.
Figure 12:
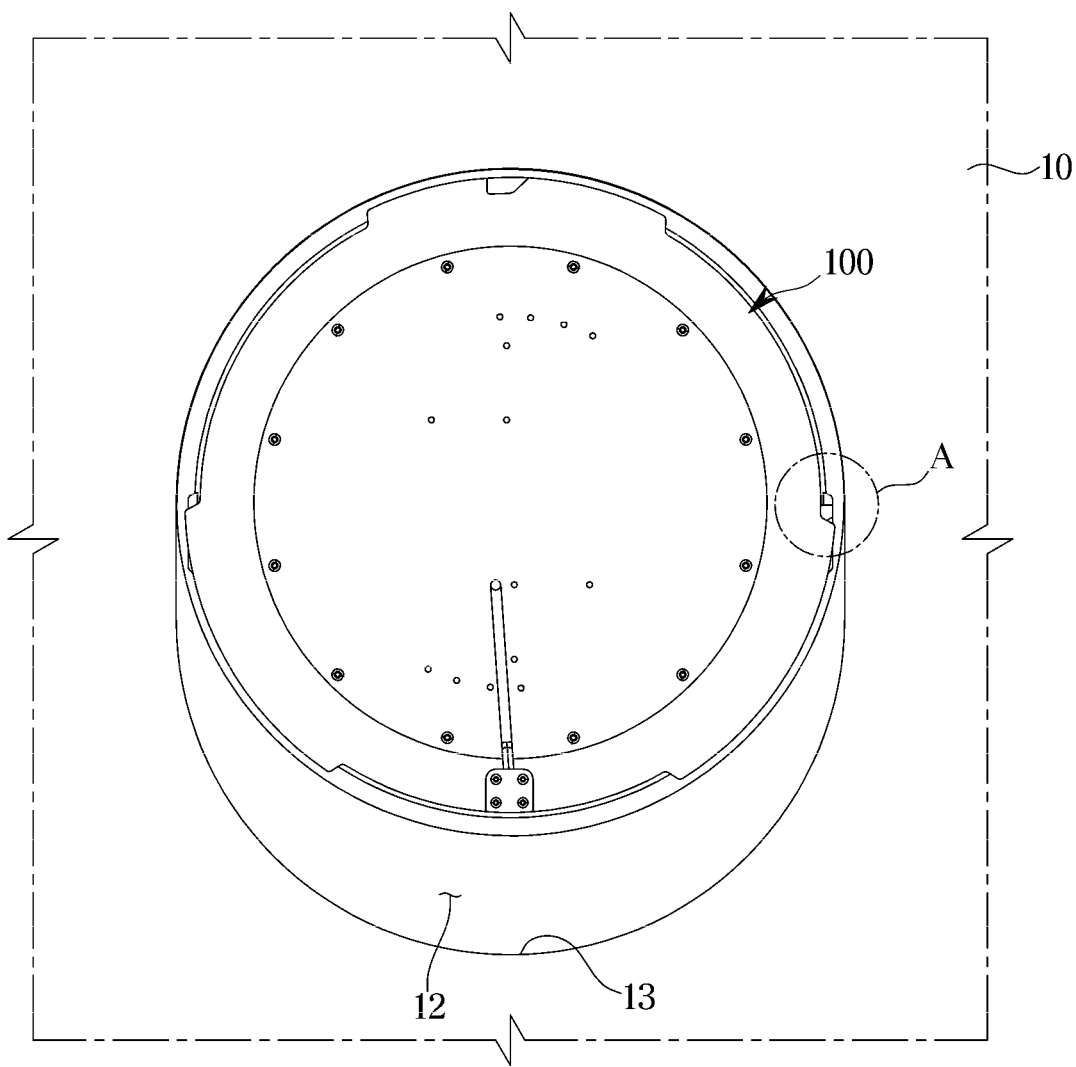
FIG. 12 is a view illustrating the rear surface of the display module and the rear surface of the rotation module in the display apparatus according to an embodiment of the disclosure, illustrating a state after the display module is coupled to the rotation module.
Figure 13:
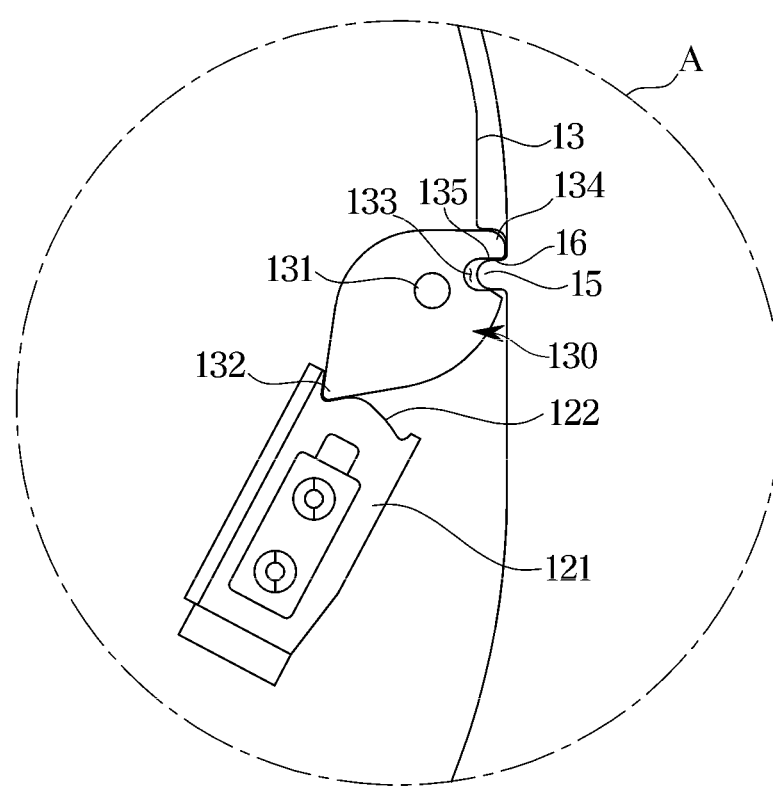
FIG. 13 is an enlarged view illustrating a part of the display module and the rotation module in the display apparatus of FIG. 12.

FIG. 10 is a view illustrating a rear surface of the display module and a rear surface of the rotation module in the display apparatus according to an embodiment of the disclosure, illustrating a state before the display module is coupled to the rotation module, FIG. 11 is an enlarged view illustrating a part of the display module and the rotation module in the display apparatus of FIG. 10, FIG. 12 is a view illustrating the rear surface of the display module and the rear surface of the rotation module in the display apparatus according to an embodiment of the disclosure, illustrating a state after the display module is coupled to the rotation module, and FIG. 13 is an enlarged view illustrating a part "A" of the display module and the rotation module in the display apparatus of FIG. 12.

Hereinafter a coupling structure of the rotation module 100 and the display module 10 according to an embodiment of the disclosure will be described in detail with reference to FIGS. 10 to 13.

Referring to FIG. 10, the mounting groove 12 to which the rotation module 100 is coupled may be provided on the rear surface of the display module 10. The mounting groove 12 may be provided in a shape in which upper and lower ends of the mounting groove 12 are respectively formed in a semicircle shape, and a straight line, between the upper and lower ends, connects the upper and lower ends. "Upper and lower ends" are defined based on a case in which the display module 10 is horizontally arranged. The straight line connecting between the upper and lower ends may be provided in parallel with the short side of the display module 10. On the other hand, the mounting groove 12 may extend in a direction parallel to the long side of the display module 10. In this case, the straight line connecting the upper end and the lower end of the mounting groove 12 may be provided in parallel with the long side of the display module 10. Hereinafter, a case where the mounting groove 12 extends in the direction parallel to the short side of the display module 10 will be described as an example.

The display module 10 may include the mounting protrusion 13 provided on the inner side of the upper end of the mounting groove 12. The mounting protrusion 13 may be formed in an approximately semicircular shape along the inner circumference of the upper end of the mounting groove 12. The mounting protrusion 13 may protrude from the inner surface of the mounting groove 12. In addition, the display module 10 may include a pair of the second coupling groove 14 and a pair of the second coupling protrusion 15 (refer to FIG. 11) provided at opposite ends of the mounting protrusion 13, respectively. In addition, a second contact point (e.g. fastener 16 of FIG. 11) may be provided at the upper end of the second coupling protrusion 15 corresponding to the lower end of the second coupling groove 14. The second contact point may include a second electrode. A position of the second contact point may vary.

The mounting groove 12 of the display module 10 may be provided in such a way that an upper end of the mounting groove 12 corresponds to the upper end of the rotation module 100. Because the rotation module 100 is provided in a substantially disc shape and the mounting groove 12 is provided in a shape in which upper and lower ends are respectively formed in a semicircle shape, and a straight line between the upper and lower ends connects the upper and lower ends, the mounting groove 12 may be larger than the rotation module 100. Therefore, the rotation module 100 may be inserted into the mounting groove 12 and moved up and down in the mounting groove 12.

When the display module 10 is coupled to the rotation module 100, the rotation module 100 may be arranged to be inserted into the mounting groove 12 as shown in FIG. 10. After the rotation module 100 is arranged to be inserted into the mounting groove 12, the display module 10 may be moved downward and then coupled to the rotation module 100, as shown in FIG. 12.

According to an embodiment of the disclosure, unlike the above-described wireless power supply method, power may be transmitted and received through fasteners 135 and 16 (refer to FIG. 11) in contact with the display module 10 and the rotation module 100 when the display module 10 is coupled to the rotation module 100. The rotation module 100 may receive power from the external power source (not shown) and transmit power from the rotation module 100 to the display module 10 through the fasteners 135 and 16, and thus the display module 10 may receive the power.

Referring to FIG. 11, before the display module 10 is coupled to the rotation module 100, the coupling member 130 may be located at one end of the guide surface 122. Particularly, the coupling member 130 may include a protrusion 132 in contact with the guide surface 122 and configured to be moved along the guide surface 122, and the protrusion 132 may be arranged on one end of the guide surface 122. The protrusion 132 may be configured to be moved within a range between one end of the guide surface 122 and the other end of the guide surface 122.

The coupling member 130 may include a first coupling groove 133 to which the second coupling protrusion 15 of the display module 10 is inserted. In addition, the coupling member 130 may include a first coupling protrusion 134 forming a part of the first coupling groove 133. The first coupling protrusion 134 may be provided to be inserted into the second coupling groove 14 of the display module 10. Further, a first contact point (e.g. fastener 135) may be provided at a lower end of the first coupling protrusion 134 corresponding to an upper end of the first coupling groove 133. A first electrode may be provided at the first contact point. A position of the first contact point may vary.

Referring to FIGS. 12 and 13, when the display module 10 is coupled to the rotation module 100, the protrusion 132 of the coupling member 130 may be moved from one end of the guide surface 122 to the other of the guide surface 122. Although not shown in the drawings, in a process in which the protrusion 132 is moved from the one end of the guide surface 122 to the other end of the guide surface 122, the protrusion 132 may press the guide member 121 to allow the guide member 121 to be moved in one direction. When the protrusion 132 is positioned at the one end or the other end of the guide surface 122, the guide member 121 may be moved in other direction opposite to the one direction by an elastic member (not shown). By the elastic member (not shown), the protrusion 132 and the guide surface 122 may be provided to maintain a contact state.

When the display module 10 is coupled to the rotation module 100, the first coupling protrusion 134 may be inserted into the second coupling groove 14. The second coupling protrusion 15 may be inserted into the first coupling groove 133. Further, the first contact point and the second contact point may maintain the contact state. The first contact point (e.g. the fastener 135) and the second contact point (e.g. the fastener 16) may be referred to as fasteners.

According to an embodiment of the disclosure, the display module 10 may receive power from the rotation module 100 in the wireless manner. In this case, power may not be transmitted through the fasteners 135 and 16.

According to another embodiment of the disclosure, the display module 10 may receive power from the rotation module 100 through the fasteners 135 and 16. Because the first contact point (e.g. fastener 135) and the second contact point (e.g. fastener 16) are provided to maintain the contact state when the display module 10 is coupled to the rotation module 100, power may be transmitted from the rotation module 100 to the display module 10 through the first contact point and the second contact point in contact with each other.

Figure 14:
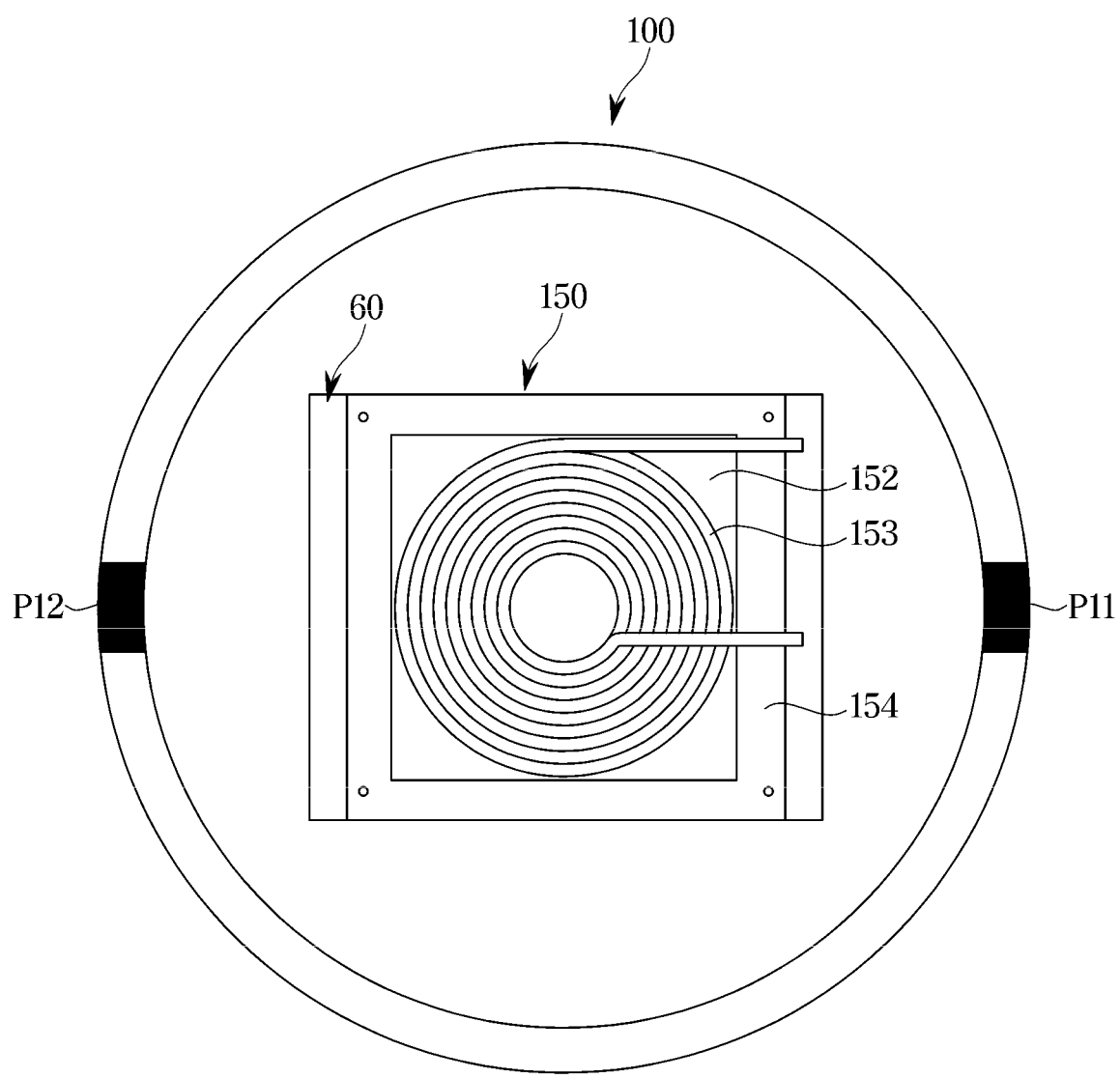
FIG. 14 is a diagram illustrating a state in which a wireless power supply module is included in the rotation module according to an embodiment of the disclosure.

FIG. 14 is a diagram illustrating a state in which a wireless power supply module is included in the rotation module 100 according to an embodiment of the disclosure.

The wireless power supply module 150 of the rotation module will be illustrated with reference to FIG. 14.

According to an embodiment, proximity wireless power supply technology may be employed to improve system reliability and simplify the configuration for the rotation module 100 upon receiving power from an adapter and transmitting the power to the rotation module 100.

According to an embodiment, the rotation module 100 may include the wireless power supply module 150.

The wireless power module may include a power board 60, a ferrite core 152, a winding 153, and an aluminum (AL) shielding plate 154 for wireless power transmission.

Meanwhile, the power board 60, the ferrite core 152, the winding 153, and the AL shielding plate 154 may form a resonator.

In addition, the rotation module 100 may include fasteners P11 and P12 coupled to the display module 10. The fasteners P11 and P12 of the rotation module 100 may include the above-described coupling member 130 and the guide member 121. According to an embodiment, the fasteners P11 and P12 may be provided with electrodes corresponding to the display module 10. In addition, according to another embodiment, the fasteners P11 and P12 may be provided with a first sensor module configured to determine whether or not the fasteners P11 and P12 are coupled to the display module.

In addition, FIG. 14 illustrates that the wireless power supply module 150 is positioned at the center of the rotation module, but is not limited thereto.

When the wireless power supply module 150 is positioned at the center of the rotation module, the power board 60, the ferrite core 152, the winding 153, and the AL shielding plate 154 may be stacked for the space utilization.

On the other hand, the configuration related to the power of the rotation module described in FIG. 14 is only an embodiment of the disclosure, and thus there is no limitation in the configuration as long as a configuration is configured to supply power to the display module.

Figure 15:
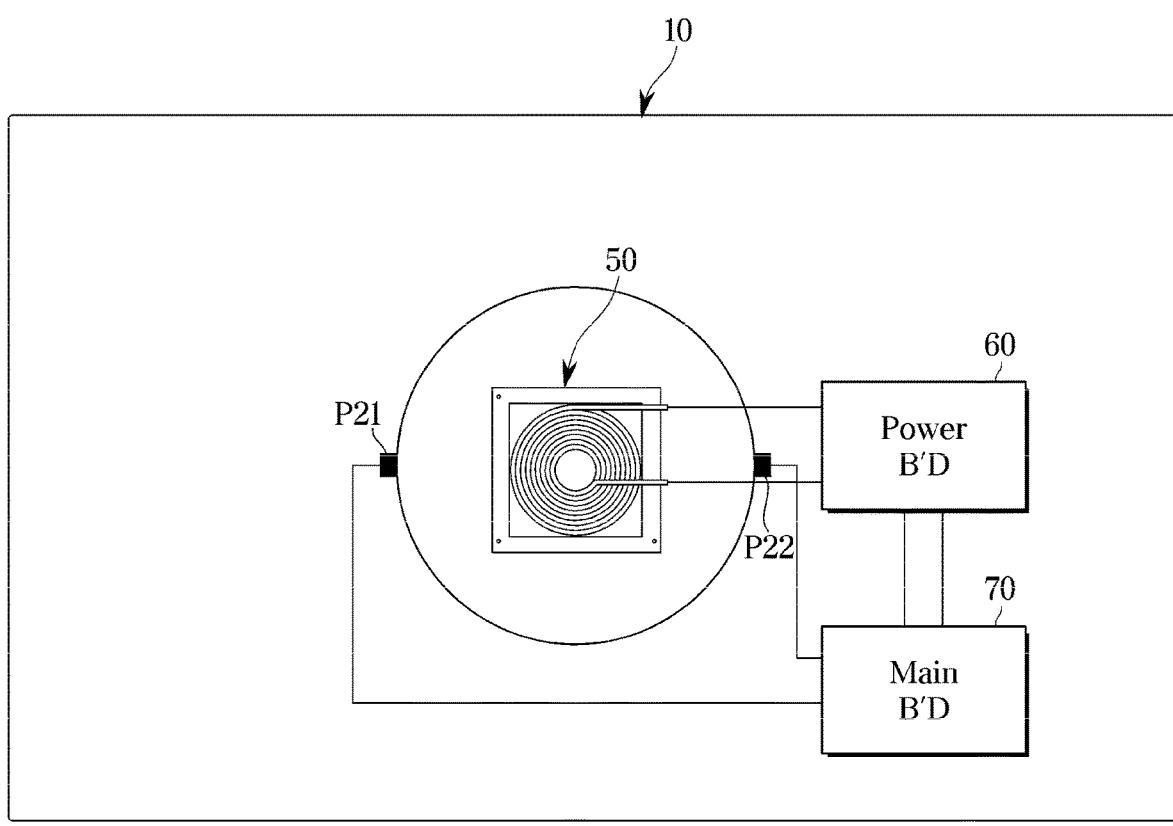
FIG. 15 is a diagram illustrating a state in which a wireless power receiving module and a sensor module are included in the display module according to an embodiment of the disclosure.

FIG. 15 is a diagram illustrating a state in which a wireless power receiving module and a sensor module are included in the display module according to an embodiment of the disclosure.

Referring to FIG. 15, the display module 10 may include fasteners P21 and P22 corresponding to the fasteners P11 and P12 of the rotation module 100. The fasteners P21 and P22 of the display module 10 may include the above-described mounting groove 12, the second coupling protrusion 15, and the second coupling groove 14.

Further, the display module 10 may include the wireless power receiving module 50 configured to receive power from the rotation module 100.

Meanwhile, the display module 10 may include at least one processor 70.

The at least one processor 70 may determine whether the display module 10 is coupled to the rotation module 100 through a second sensor module provided in the display module.

The first sensor module and the second sensor module according to an embodiment may include a magnetic sensor, and a brightness sensor, but is not limited thereto. Therefore, any configuration may be employed as long as a configuration is configured to obtain a signal for determining whether the display module is coupled to the rotation module.

On the other hand, when it is determined that the display module 10 is coupled to the rotation module 100, the at least one processor 70 may allow the wireless power supply module 150 provided in the rotation module 100 to supply power to the wireless power receiving module 50 provided in the display module 10.

In addition, when the rotation module 100 and the display module 10 are connected to each other, the at least one processor 70 of the display module may control the adapter and the rotation module.

Accordingly, when the at least one processor 70 provided in the display module 10 determines that the rotation module 100 is coupled to the display module 10, the at least one processor 70 may allow each configuration to receive power.

As mentioned above, according to an embodiment, the coupling member 130 of the rotation module 100 may include the first coupling groove 133 and the first coupling protrusion 134, and the display module 10 may include the second coupling groove 14 and the second coupling protrusion 15. As the first coupling protrusion 134 is inserted into the second coupling groove 14 and the second coupling protrusion 15 is inserted into the first coupling groove 133, the rotation module 100 may be coupled to the display module 10.

The coupling member 130 of the rotation module 100 may include the first contact point (e.g. fastener 135), and the first electrode may be provided at the first contact point. Further, the display module 10 may include the second contact point (e.g. fastener 16) corresponding to the first contact point, and the second electrode may be provided at the second contact point. As described above, when the display module 10 is coupled to the rotation module 100, the first contact point and the second contact point may be provided to maintain the contact state.

Meanwhile, the at least one processor 70 may determine whether the rotation module 100 is coupled to the display module 10 through the first electrode and the second electrode, and transmit the signal to other components as described above.

Further, the configuration related to the power of the display module 10 described in FIG. 15 is only an example embodiment of the disclosure, and thus there is no limitation in the configuration as long as a configuration is configured to allow the display module 10 to receive power.

Figure 16:
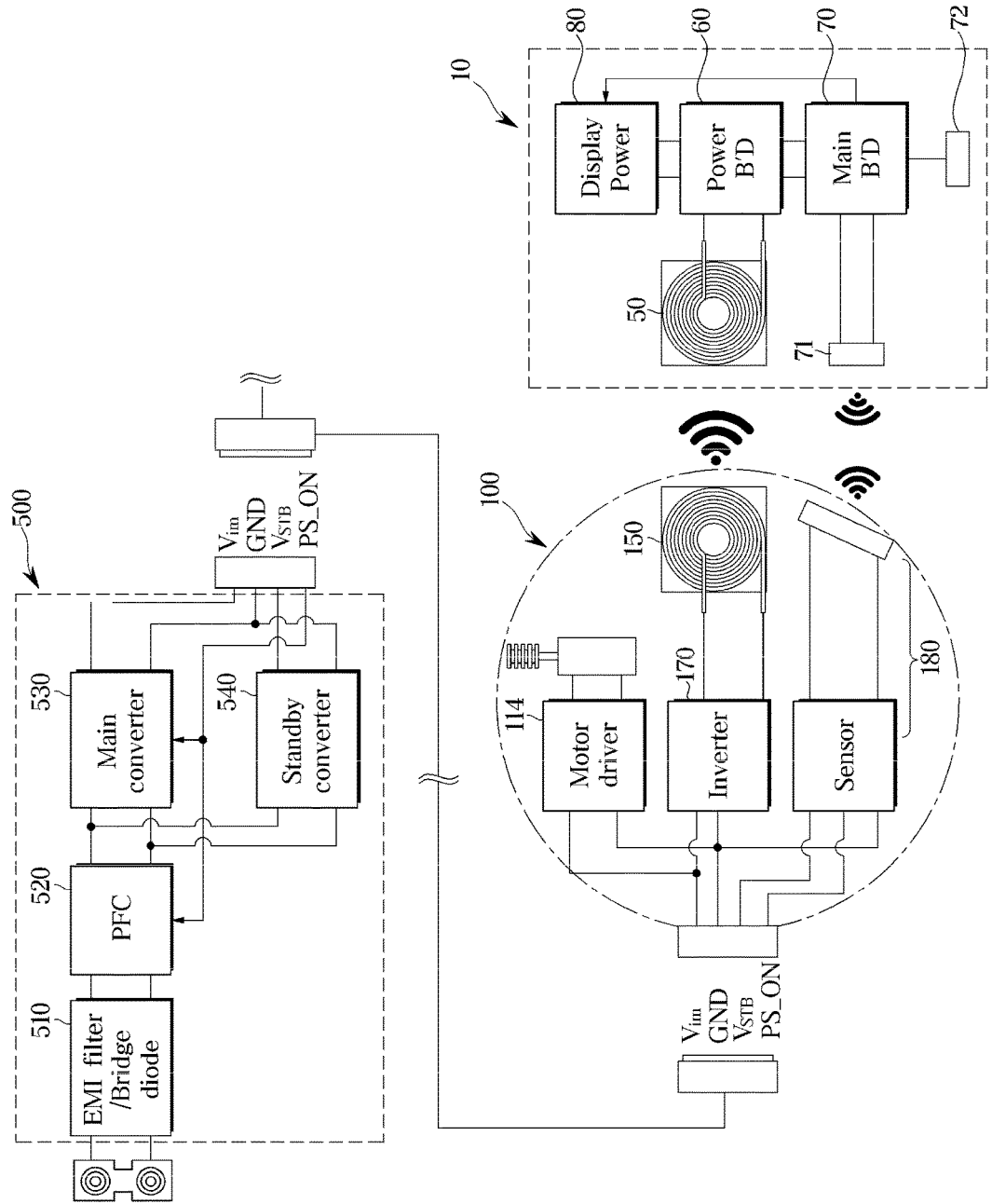
FIG. 16 is a diagram illustrating an operation in which the display module receives power through the wireless power supply module.
Figure 17:
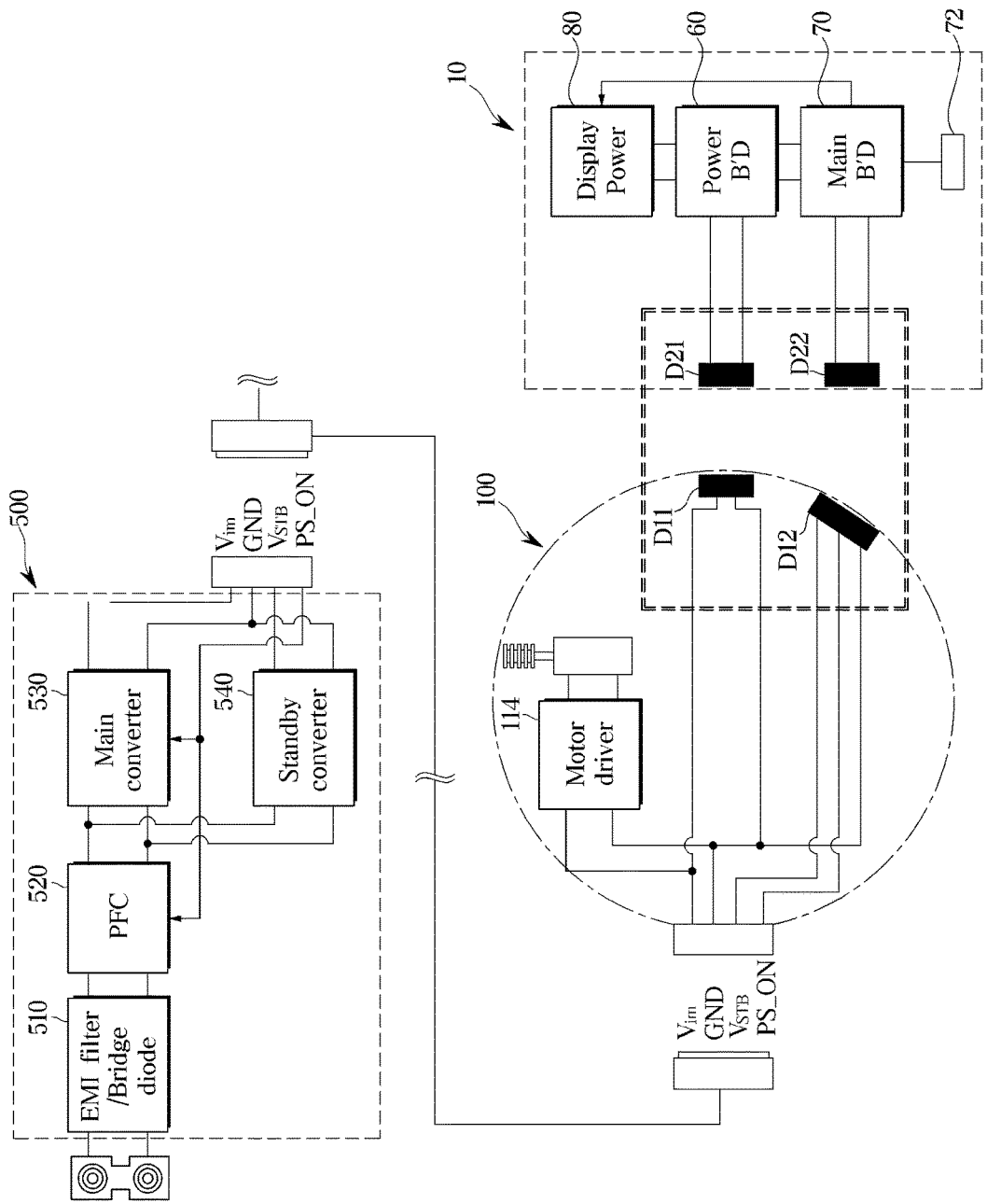
FIG. 17 is a diagram illustrating an operation in which the display module receives power through an electrode.

FIGS. 16 and 17 are diagrams illustrating an operation among the adapter, the rotation module and the display module according to an embodiment of the disclosure.

FIG. 16 is a diagram illustrating an operation in which the display module 10 receives power through the wireless power supply module 150.

Referring to FIG. 16, the display apparatus may include an adapter 500, the rotation module 100, and the display module 10.

The adapter 500 according to an embodiment may include an EMI filter/Bridge diode 510 configured to convert commercial AC power to DC and a power factor correction (PFC) circuit 520.

The adapter may include a main converter 530 including a DC-DC converter configure to insulate converted DC voltage and convert DC voltage to required voltage, and a standby converter 540 for a standby state. According to an embodiment, it is illustrated that the main converter 530 and the standby converter 540 are separately provided, but the main converter and the standby converter may be integrally formed with each other.

Further, power may be transferred between the adapter 500 and the rotation module 100 through an external connector cable. Power may be transferred between the rotation module 100 and the display module 10 through the wireless power transmission method. Alternatively, power may be transferred between the rotation module 100 and the display module 10 through the first electrode provided in the first contact point of the rotation module 100 and the second electrode provided in the second contact point of the display module 10.

The rotation module 100 may include the wireless power supply module 150 configured to transmit power supplied from the adapter 500 to the display module 10.

The wireless power supply module 150 may be connected to an inverter 170 configured to supply power.

Further, the rotation module 100 may further include a drive motor 114 required for the operation of the rotation module 100 itself and a first sensor module 180 (e.g. a first sensor).

When the rotation module 100 is connected to the display module 10, the at least one processor 70 provided in the display module 10 may receive information related to the presence or absence of the connection, and the standby state by using the signal of the first sensor module 180 and the second sensor module 71 through the wireless communication, and transmit the information to the adapter 500.

According to an embodiment, when the display module 10 is coupled to the rotation module 100, the display module 10 and the rotation module 100 may transmit and receive a signal of the first sensor module 180 and the second sensor module 71 (e.g. a second sensor) and thus the at least one processor 70 may determine that the display module 10 is coupled to the rotation module 100 based on the signal.

In addition, the display module may further include a power board 60 configured to receive power and a power supply 80 configured to store power based on the receiving of the power by the power board 60.

The display module 10 may drive the display module 10 with power supplied from the adapter 500. Additionally, the display module 10 may transmit ON/OFF state of the display apparatus, which is received through an external IR signal acquired through an IR sensor 72, to the rotation module 100.

FIG. 17 is a diagram illustrating an operation in which the display module receives power through an electrode.

According to another embodiment of the disclosure, a rotation module 100 may include first electrodes D11 and D12, and a display module 10 may include second electrodes D21 and D22.

The rotation module 100 may supply power through an electrode.

The rotation module 100 may include a pair of the coupling member 130 (refer to FIG. 11). Each of the pair of the coupling member 130 may include the first electrodes D11 and D12 provided at a first contact point (e.g. fastener 135).

The display module 10 may include a pair of the second coupling groove 14 (refer to FIG. 11). The pair of the second coupling groove 14 may include a second contact point (e.g. fastener 16) and second electrodes D21 and D22 provided at the second contact point.

Accordingly, each of the rotation module 100 and the display module 10 may include at least one pair of the first electrodes D11 and D12 and the second electrodes D21 and D22.

Particularly, a coupling member 130 of the rotation module 100 may include a first coupling groove 133 and a first coupling protrusion 134, and the display module 10 may include a second coupling groove 14 and a second coupling protrusion 15.

The coupling member 130 of the rotation module 100 may include the first contact point (e.g. fastener 135), and the first electrodes D11 and D12 may be provided at the first contact point. In addition, the display module 10 may include the second contact point (e.g. fastener 16) corresponding to the first contact point, and the second electrodes D21 and D22 may be provided at the second contact point. When the display module 10 is coupled to the rotation module 100, the first contact point and the second contact point may be provided to maintain a contact state.

When the first electrodes D11 and D12 provided in the rotation module 100 are connected to the second electrodes D21 and D22 provided in the display module 10, at least one processor 70 in the display module 10 may determine whether the rotation module 100 is coupled to the display module 10 based on signals exchanged between the electrodes.

In addition, when it is determined that the rotation module 100 is coupled to the display module 10, the at least one processor 70 provided in the display module 10 may allow power to be supplied to the display module 10 through at least one pair of the first electrodes D11 and D12 and the second electrodes D21 and D22.

Meanwhile, the operation described with reference to FIGS. 16 and 17 is only an example embodiment of the disclosure, and thus there is no limitation in the operation as long as an operation in which the rotation module transmits power to the display module.

Figure 18:
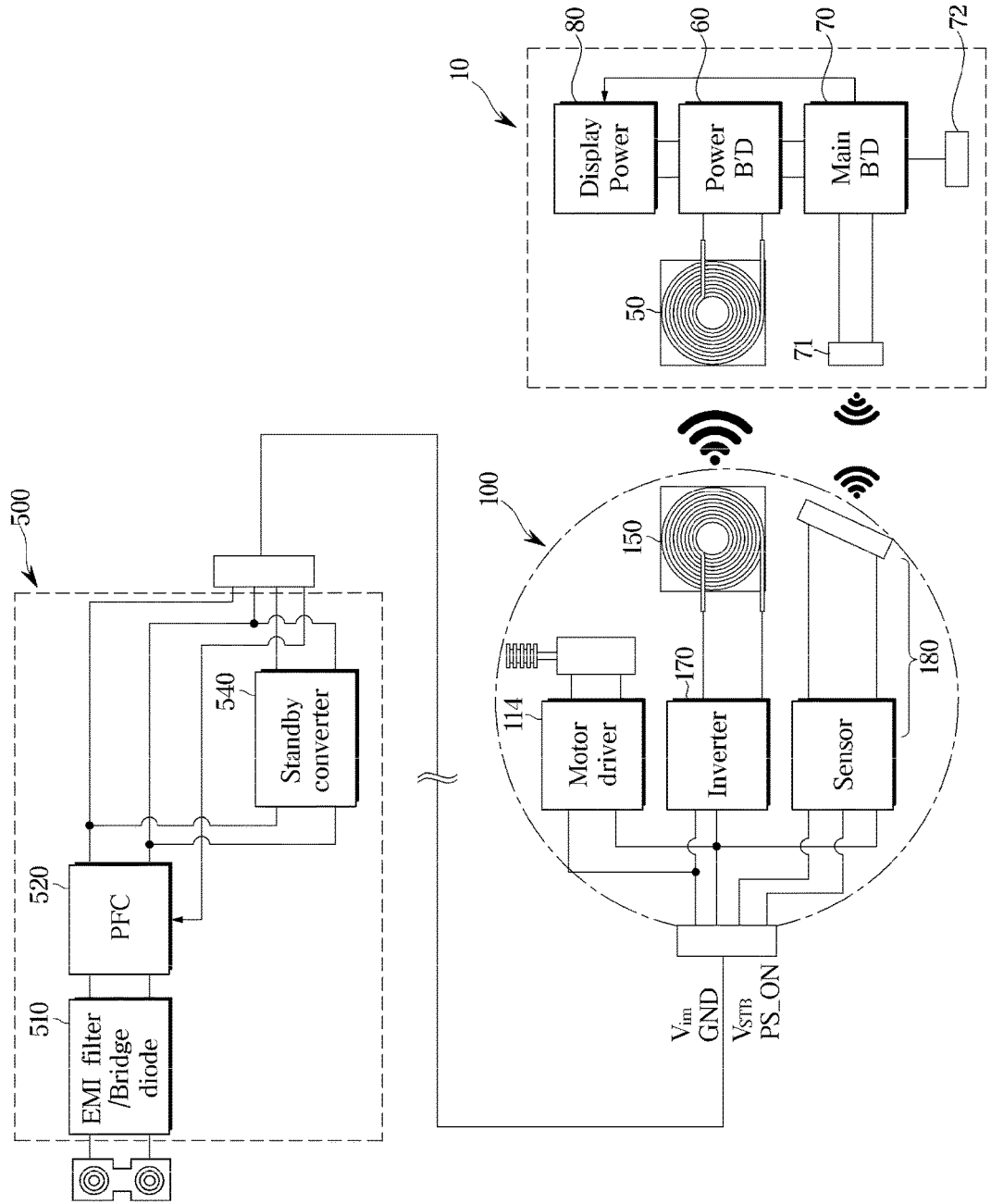
FIG. 18 is a diagram illustrating an operation of an adapter according to an embodiment of the disclosure.

FIG. 18 is a diagram illustrating an operation of an adapter according to an embodiment of the disclosure.

The adapter 500 and the rotation module 100 may be provided with a direct connection structure.

The direct connection structure may be a structure in which the adapter 500 and the rotation module 100 are integrally provided as a structure that cannot be separated.

In this case, an inverter 170 provided in the rotation module 100 may perform the function of the DC converter. Therefore, unlike in the above-described embodiment, a main converter may be excluded from the adapter 500.

When the adapter and the rotation module are provided as an integral type corresponding to a non-separable type, the functions of the main converter and the wireless power transmitter may be integrated so as to exclude a power conversion step, thereby increasing efficiency. In addition, the volume of the adapter may be reduced and it may lead to a positive effect on the overall system design.

Meanwhile, FIG. 18 illustrates the direct connection structure in which the adapter is provided integrally with the rotation module. In the above-described embodiment, the adapter may be detachable from the rotation module and in this case, the above-described main converter may be provided in the adapter.

Figure 19:
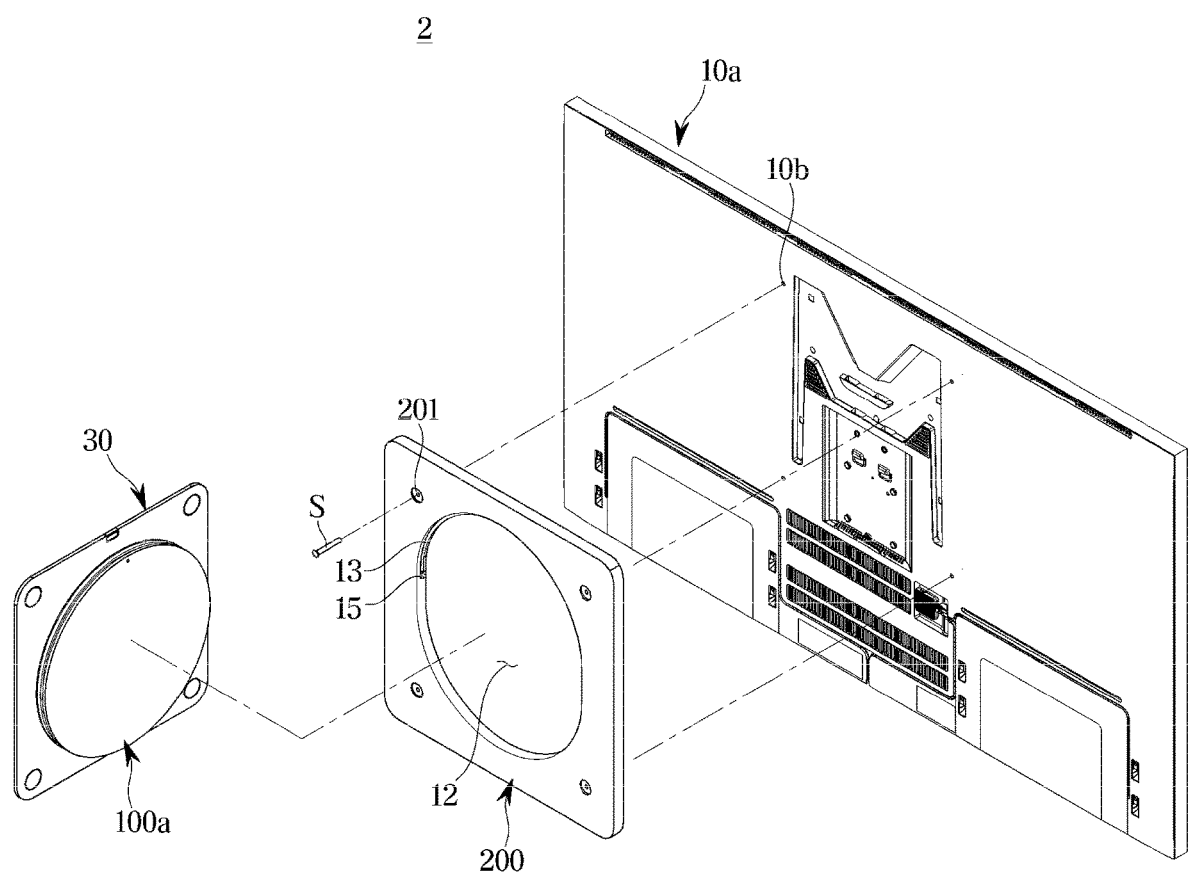
FIG. 19 is a view illustrating a display apparatus according to another embodiment of the disclosure.

FIG. 19 is a view illustrating a display apparatus according to another embodiment of the disclosure.

According to another embodiment of the disclosure, a display apparatus 2 may include a display module 10a, a rotating bracket 200 coupled to the display module 10a, a rotation module 100a coupled to the rotating bracket 200, and a bracket 30 coupled to the rotation module 100a.

According to another embodiment of the disclosure, the display apparatus 2 may further include a locking device configured to prevent the display module 10a and the rotation module 100a from being separated from each other when the display module 10a is coupled to the rotation module 100a.

The locking device may be configured to lock the rotating bracket 200 to the rotation module 100a when the rotating bracket 200 mounted on a rear surface of the display module 10a is coupled to the rotation module 100a. In addition, the locking device may be configured to release the locking of the display module 10a and the rotation module 100a when the rotating bracket 200 is separated from the rotation module 100a.

The locking device may include a coupling member (not shown) provided in the rotation module 100a, and a mounting groove 12 and a mounting protrusion 13 provided in the rotating bracket 200. Particularly, the locking device may include a first coupling protrusion and a first coupling groove provided in the coupling member, and a second coupling protrusion 15 and a second coupling groove (not shown) provided in the rotating bracket 200. Although not shown in FIG. 19, the coupling member, the first coupling protrusion, the first coupling groove, and the second coupling groove may be provided with the same structure as shown in FIGS. 11 and 13.

The display module 10a may be connected to an external power source (not shown) through a wire (not shown) so as to receive power. That is, the display module 10a may be provided to be operated by being independently connected to an external power supply (not shown). That is, the display module 10a may refer to a general display apparatus sold on the market.

A plurality of fastening holes 10b may be provided on the rear surface of the display module 10a. The plurality of fastening holes 10b may include holes commonly provided on the rear surface of a commercially available display apparatus. For example, the plurality of fastening holes 10b may include VESA mounting holes.

The display apparatus 2 may include the rotating bracket 200. The rotating bracket 200 may be configured to be coupled to the rear surface of the display module 10a through a fastening member S. The rotating bracket 200 may include a hole 201 corresponding to each of the plurality of fastening holes 10b and configured to allow the fastening member S to be inserted therein.

As the fastening member S passes through the hole 201 of the rotating bracket 200 and is fastened to one of the fastening holes 10b of the display module 10a, the rotating bracket 200 may be coupled to the rear surface of the display module 10a.

When the rotating bracket 200 is coupled to the rear surface of the display module 10a, the display module 10a may be coupled to the rotation module 100a through the rotating bracket 200.

The rotating bracket 200 may include the above-described mounting groove 12, the mounting protrusion 13, the second coupling groove 14 and the second coupling protrusion 15. Description of the specific structure of the mounting groove 12, the mounting protrusion 13, the second coupling groove 14 and the second coupling protrusion 15 is the same as the above-mentioned description, and thus further description is omitted.

The rotation module 100a may be detachably coupled to the rotating bracket 200. When the rotating bracket 200 is coupled to the rotation module 100*a*, the rotation module 100*a* may rotate the rotating bracket 200 from a first position to a second position or from the second position to the first position. The rotation module 100*a* may rotate the display module 10*a* coupled to the rotating bracket 200 by rotating the rotating bracket 200. Because description of the specific structure of the rotation module 100*a* is the same as the above, further description is omitted.

The rotation module 100*a* may not be configured to supply power to the display module 10*a*. The rotation module 100*a* and the display module 10*a* are respectively connected to an external power source (not shown) to receive power from the external power source.

The rotation module 100*a* may be detachably coupled to the bracket 30. Because description of the specific structure of the bracket 30 is the same as the above, further description is omitted.

According to another embodiment of the disclosure, the rotation module 100*a* may be configured to receive power from the display module 10*a* by being connected to the display module 10*a* through a wire (not shown). The display module 10*a* may be connected to an external power source (not shown) to receive power, and the rotation module 100*a* may be connected to the display module 10*a* to receive power from the display module 10*a*.

According to another embodiment of the disclosure, the rotation module 100*a* may be provided integrally with the bracket 30. In the above embodiments, the rotation module 100 may be detachably coupled to the bracket 30, but according to another embodiment of the disclosure, the rotation module 100*a* may be provided integrally with the bracket 30. In this case, the rotation module 100*a* may not be detachable from the bracket 30. Accordingly, it is possible to simplify the structure of the rotation module 100*a* and the bracket 30.

As is apparent from the above description, the display apparatus may include a display module and a supporter configured to rotatably support the display module and configured to be detachable from the display module.

The display apparatus may have improved usability by selectively using a wall-mounted type or a stand-type.

The display apparatus may easily change the type and allow easy movement, and rotate a display module.

The display apparatus may include a display module configured to be driven without being directly connected to an external power supply.

The display apparatus may have improved productivity by including a rotation module applicable to a display module in various sizes and in various types.

The display apparatus may include a supporter configured to rotatably support a conventional display module by including a rotating bracket coupled to a conventional display module and a rotation module configured to rotate the rotating bracket.

Although a few embodiments of the disclosure have been shown and described, it would be appreciated by those skilled in the art that changes may be made in these embodiments without departing from the principles and spirit of the disclosure,

What is claimed is:

1. A display apparatus comprising:
a display comprising a front surface configured to display an image and a rear surface provided with a mounting groove;
a rotation module comprising at least one body that is configured to couple to the display by being inserted into the mounting groove, the rotation module further comprising a drive motor configured to provide a driving force to rotate the display about an axis perpendicular to the front surface and the rear surface of the display; and
a bracket configured to be mounted on a stand or a wall and to which the rotation module is coupled,
wherein the display and the rotation module are configured to lock together by the display and the rotation module being coupled,
wherein the rotation module further comprises a fixed plate configured to be coupled to the bracket by being rotated in a first direction about the bracket and configured to be separated from the bracket by being rotated in a second direction opposite to the first direction about the bracket, and
wherein the at least one body of the rotation module comprises a rotating plate coupled to the fixed plate and configured to be rotated in the first direction or the second direction about the fixed plate.

2. The display apparatus of claim 1, wherein
the mounting groove comprises a coupling protrusion that protrudes from one surface of the mounting groove, and
the at least one body of the rotation module comprises a coupling groove in which the coupling protrusion is inserted.

3. The display apparatus of claim 2, wherein
the at least one body of the rotation module comprises a coupling comprising the coupling groove, and the coupling is configured to be rotatable within a predetermined range.

4. The display apparatus of claim 3, wherein
the coupling is configured to be rotated in a first direction such that the coupling protrusion is inserted into the coupling groove when the display and the rotation module are coupled together, and
the coupling is configured to be rotated in a second direction opposite to the first direction such that the coupling protrusion is removed from the coupling groove when the display and the rotation module are separated.

5. The display apparatus of claim 4, further comprising:
a rotating bracket comprising the mounting groove, the rotating bracket configured to be mounted on the rear surface of the display.

6. The display apparatus of claim 1, wherein
the rotation module is configured to be coupled to or separated from the bracket without a separate tool.

7. The display apparatus of claim 1, wherein
the fixed plate comprises the drive motor and at least one gear connected to the drive motor such that the at least one gear is configured to transmit the driving force of the drive motor, and
the rotating plate is configured to connect to the at least one gear and be rotated by the at least one gear.

8. The display apparatus of claim 1, wherein
the display is configured to be coupled to or separated from the rotation module without a separate tool.

9. The display apparatus of claim 1, wherein
the display is configured to receive electric power from the rotation module.

10. The display apparatus of claim 1, wherein
the display is configured to receive electric power wirelessly.

11. The display apparatus of claim 1, further comprising:
an adapter configured to supply electric power received from an external power source, wherein the display comprises:
at least one processor configured to allow the electric power to be received from the adapter and to be supplied to the display through the rotation module.

12. The display apparatus of claim 11, wherein
the rotation module further comprises:
a wireless power supply configured to receive the electric power from the adapter and supply the electric power to the display; and
a first sensor configured to obtain a signal of the display, and
the display further comprises:
a second sensor configured to obtain a signal of the rotation module; and
a wireless power receiver configured to receive the electric power from the wireless power supply,
wherein the at least one processor is configured to allow the wireless power receiver to receive the electric power supplied from the wireless power supply based on a determination that the rotation module is coupled to the display based on the signal obtained by the second sensor.

13. The display apparatus of claim 11, wherein
the at least one body of the rotation module comprises a first electrode comprising a first contact point that is configured to come in contact with a second contact point of the display by the display and the rotation module being coupled,
the display comprises a second electrode comprising the second contact point, and
the at least one processor is configured to allow the electric power to be supplied to the display through the first electrode and the second electrode based on a determination that the rotation module is coupled to the display based on a signal exchanged between the first electrode and the second electrode.

14. The display apparatus of claim 11, wherein
the adapter and the rotation module are integrally provided, and
the rotation module further comprises a converter configured to convert the electric power that is received by the adapter to direct current power corresponding to the display.

15. A display apparatus comprising:
a display comprising a front surface configured to display an image;
a rotating bracket configured to be mounted on a rear surface of the display and comprising a mounting groove;
a rotation module comprising at least one body that is configured to be coupled to the rotating bracket by being inserted into the mounting groove, and further comprising a drive motor configured to provide a driving force so as to rotate the rotating bracket; and
a bracket configured to be mounted on a stand or a wall and to which the rotation module is coupled,
wherein the rotating bracket and the rotation module are configured to lock together by the rotating bracket and the rotation module being coupled,
wherein the rotation module further comprises a fixed plate configured to be coupled to the bracket by being rotated in a first direction about the bracket and configured to be separated from the bracket by being rotated in a second direction opposite to the first direction about the bracket, and
wherein the at least one body of the rotation module comprises a rotating plate coupled to the fixed plate and configured to be rotated in the first direction or the second direction about the fixed plate.

16. The display apparatus of claim 15, wherein
the display is configured to receive electric power from the rotation module.

17. A rotation module configured to be coupled to a rotating bracket mounted on a rear surface of a display and a bracket configured to be mounted on a stand or a wall and to which the rotation module is coupled, the rotation module comprising:
a fixed plate comprising a drive motor and at least one gear connected to the drive motor such that the at least one gear is configured to transmit a driving force of the drive motor; and
a rotating plate configured to connect to the at least one gear and be rotated by the at least one gear and further configured to be coupled to the rotating bracket,
wherein the fixed plate is configured to be coupled to the bracket by being rotated in a first direction about the bracket and is configured to be separated from the bracket by being rotated in a second direction opposite to the first direction about the bracket, and
wherein the rotating plate is coupled to the fixed plate and is configured to be rotated in the first direction or the second direction about the fixed plate.

18. An apparatus comprising:
a rotating bracket comprising a mounting groove with a coupling protrusion, the rotating bracket configured to mount on a rear surface of a display; and
a rotation module configured to be coupled to the rotating bracket, the rotation module comprising:
at least one body configured to couple to the rotating bracket by being inserted into the mounting groove of the rotating bracket;
a drive motor configured to rotate the at least one body to rotate the display about an axis perpendicular to a front surface of the display; and
a fixed plate configured to be coupled to the bracket by being rotated in a first direction about the bracket and configured to be separated from the bracket by being rotated in a second direction opposite to the first direction about the bracket,
wherein the at least one body of the rotation module comprises a rotating plate coupled to the fixed plate and configured to be rotated in the first direction or the second direction about the fixed plate.

19. The apparatus of claim 18, wherein the at least one body of the rotation module comprises:
a coupling groove that is configured to be rotated such that the coupling protrusion of the rotating bracket is coupled to the coupling groove.

20. The apparatus of claim 18, wherein
the mounting groove of the rotating bracket has a size, in a linear direction that is perpendicular to an insertion direction of the rotation module into the mounting groove, that is greater than a size of the rotation module in the linear direction, and
the at least one body of the rotation module is configured to couple to the rotating bracket by moving in the linear direction while inside the rotation module.

* * * * *